US012742711B2

(12) United States Patent
Yousefiani et al.

(10) Patent No.: US 12,742,711 B2
(45) Date of Patent: Sep. 22, 2026

(54) SYSTEMS AND METHODS FOR MATERIAL TESTING AND MATERIAL TESTPIECES

(71) Applicant: The Boeing Company, Arlington, VA (US)

(72) Inventors: Ali Yousefiani, Tustin, CA (US); Joseph S. Indeck, Huntsville, AL (US); Bruno Zamorano Senderos, Huntsville, AL (US); Austin E. Mann, Chesterfield, MO (US); Scott Cummings, Long Beach, CA (US)

(73) Assignee: The Boeing Company, Arlington, VA (US)

( * ) Notice: Subject to any disclaimer, the term of this patent is extended or adjusted under 35 U.S.C. 154(b) by 349 days.

(21) Appl. No.: 18/517,396

(22) Filed: Nov. 22, 2023

(65) Prior Publication Data

US 2025/0164367 A1 May 22, 2025

(51) Int. Cl.
*G01N 3/12* (2006.01)
*B33Y 80/00* (2015.01)

(52) U.S. Cl.
CPC ................ *G01N 3/12* (2013.01); *B33Y 80/00* (2014.12); *G01N 2203/0226* (2013.01); *G01N 2203/0274* (2013.01)

(58) Field of Classification Search
CPC ............. G01N 3/12; G01N 2203/0226; G01N 2203/0274; G01N 3/10; G01N 2203/0003; G01N 2203/0017; G01N 2203/0042; G01N 2203/0069; G01N 2203/0222; G01N 2203/0266; G01N 3/08; G01N 1/28; G01N 1/44; G01N 3/02; G01N 3/18; B33Y 80/00
See application file for complete search history.

(56) References Cited

U.S. PATENT DOCUMENTS 3,958,448 A * 5/1976 Willis ...................... G01N 3/12 73/52
5,220,824 A * 6/1993 Shelleman ............... G01N 3/12 374/57
5,954,224 A 9/1999 Berger et al.
6,591,690 B1 * 7/2003 Crockford ................ G01N 3/10 73/760
7,040,143 B2 * 5/2006 Johnson .............. G01M 3/3281 73/49.3

(Continued)

FOREIGN PATENT DOCUMENTS

CN 106840922 A 6/2017
CN 112730075 A * 4/2021 ............... G01N 3/12
CN 114778307 A 7/2022

OTHER PUBLICATIONS

European Patent Office, Extended European Search Report, App. No. 24201104.7 (Mar. 6, 2025).

(Continued)

*Primary Examiner* — Freddie Kirkland, III
(74) *Attorney, Agent, or Firm* — Walters & Wasylyna LLC

(57) ABSTRACT

A material testing system and method includes a testpiece, a test bed, and a data collector. The testpiece includes a body that extends along an axis and a hollow interior that is formed by the body. The test bed internally pressurizes the hollow interior of the testpiece. The data collector acquires data representing the testpiece.

20 Claims, 17 Drawing Sheets

(56) References Cited

U.S. PATENT DOCUMENTS

| | | | | |
|---|---|---|---|---|
| 7,224,475 | B2 * | 5/2007 | Robertson | E21B 41/0064 356/244 |
| 8,191,415 | B2 * | 6/2012 | Stommel | G01M 15/02 73/116.02 |
| 8,205,484 | B2 * | 6/2012 | Sasaki | G01M 3/3263 73/40 |
| 8,950,268 | B2 | 2/2015 | Ota | |
| 9,612,181 | B2 * | 4/2017 | Mann | G01M 3/04 |
| 10,139,337 | B2 * | 11/2018 | Greegor | B06B 3/00 |
| 10,300,656 | B2 * | 5/2019 | Pleasants | B29C 35/0805 |
| 11,175,214 | B2 * | 11/2021 | Williams | G01N 3/20 |
| 11,565,477 | B2 * | 1/2023 | Griffis | B22F 10/385 |
| 11,733,181 | B1 * | 8/2023 | Topich | G01N 3/165 73/788 |
| 11,846,612 | B2 * | 12/2023 | Ferracane | G01N 3/10 |
| 2005/0044960 | A1 * | 3/2005 | Johnson | G01N 19/08 73/760 |
| 2006/0146345 | A1 * | 7/2006 | Robertson | E21B 41/0064 356/625 |
| 2012/0227467 | A1 * | 9/2012 | Baek | G01N 3/12 73/40.7 |
| 2017/0107362 | A1 | 4/2017 | Tanabe | |
| 2022/0080667 | A1 * | 3/2022 | Griffis | B22F 10/38 |

OTHER PUBLICATIONS

Gorsse et al: From High Entropy Alloys to Complex Concentrated Alloys, *Comptes Rendus Physique*, vol. 19, Issue 8 pp. 721-736 (Oct. 2018). https:doi.org/10.1016/j.crhy.2018.09.004.

Heckman et al.: Automated High Throughput Tensile Testing Reveals Stochastic Process Parameter Sensitivity, *Materials Science and Engineering: A*, vol. 722 (2020). https://doi.org/10.1016/j.msea.2019.138632.

Berke et al.: “Damage Accumulation in a Novel High-Throughput Technique to Characterize High Cycle Fatigue,” *Journal of Testing and Evaluation* (2020).

Hill et al: “Non-Contact Strain Measurement to Eliminate Strain Gages in Vibration-Based High Cycle Fatigue Testing,” *The Journal of Strain Analysis for Engineering Design*, (Feb. 9, 2022). https://journals.sagepub.com/doi/10.1177/03093247221076765.

* cited by examiner 102
106
174
162
220
108
160
176
166
218
164
154
158
212
214
152
156

102
106
166
162
218
220
108
160
164
154
158
212
214
152
156

102
106
154
158
212
214
152
156

SYSTEMS AND METHODS FOR MATERIAL TESTING AND MATERIAL TESTPIECES

FIELD

The present disclosure relates generally to material testing and, more particularly, to systems and methods for high-throughput testing of materials and material testpieces for use with such high-throughput testing systems and methods.

BACKGROUND

When designing a manufactured article, it is desirable to computationally model the performance of the article. Computational models are generated using material property data gathered through experimental testing of a material under different conditions. Standard testing methodologies rely on testing one material specimen for one material property data set per test. Thus, in order to develop a characterization for a given material, a number of tests must be performed to acquire a plurality of data sets. However, advances in material science, such as alloys and additive manufacturing, enable exceedingly large numbers of potential material combinations. The vast number of material options make standard testing methodologies unfeasible from both a cost and time standpoint. Accordingly, those skilled in the art continue with research and development efforts in high-throughput material testing.

SUMMARY

Disclosed are examples of a system and method for material testing and a material testpiece used with the system and method. The following is a non-exhaustive list of examples, which may or may not be claimed, of the subject matter according to the present disclosure.

In an example, the disclosed system includes a testpiece, a test bed, and a data collector. The testpiece includes a body that extends along an axis and a hollow interior that is formed by the body. The test bed internally pressurizes the hollow interior of the testpiece. The data collector acquires data representing the testpiece.

In another example, the disclosed system includes a testpiece. The testpiece includes a body that extends along an axis and a hollow interior formed by the body. The hollow interior of the testpiece is configured to be pressurized.

In an example, the disclosed testpiece includes a body that extends along an axis and a hollow interior formed by the body. The hollow interior of the testpiece is configured to be pressurized.

In an example, the disclosed method includes steps of: (1) internally pressurizing a testpiece; (2) acquiring data representing the testpiece while internally pressurizing; and (3) determining at least one property of the testpiece using the data.

Other examples of the system, the method, and the testpiece will become apparent from the following detailed description, the accompanying drawings, and the appended claims.

DETAILED DESCRIPTION

Referring generally to FIGS. 1-21, by way of examples, the present disclosure is directed to a system 100 for material testing, which may also be referred to as a material testing system. The present disclosure is also directed to a testpiece 102, which may also be referred to as a material testpiece, for use with the system 100. The system 100 and the testpiece 102 facilitate improvements in material testing by enabling multiple materials to be tested in a single test, multiple test parameters to be tested in a single test, and multiple material properties to be measured in a single test.

For the purpose of the present disclosure, a testpiece refers to a sample or specimen of one or more materials that is tested to determine one of more physical properties or characteristics of the one or more materials. The testpiece can have any suitable dimensions and/or geometries. The physical properties or characteristics determined for the testpiece can be used to represent physical properties or characteristics of manufactures articles, components, or structures made of the same materials.

Figure 1:
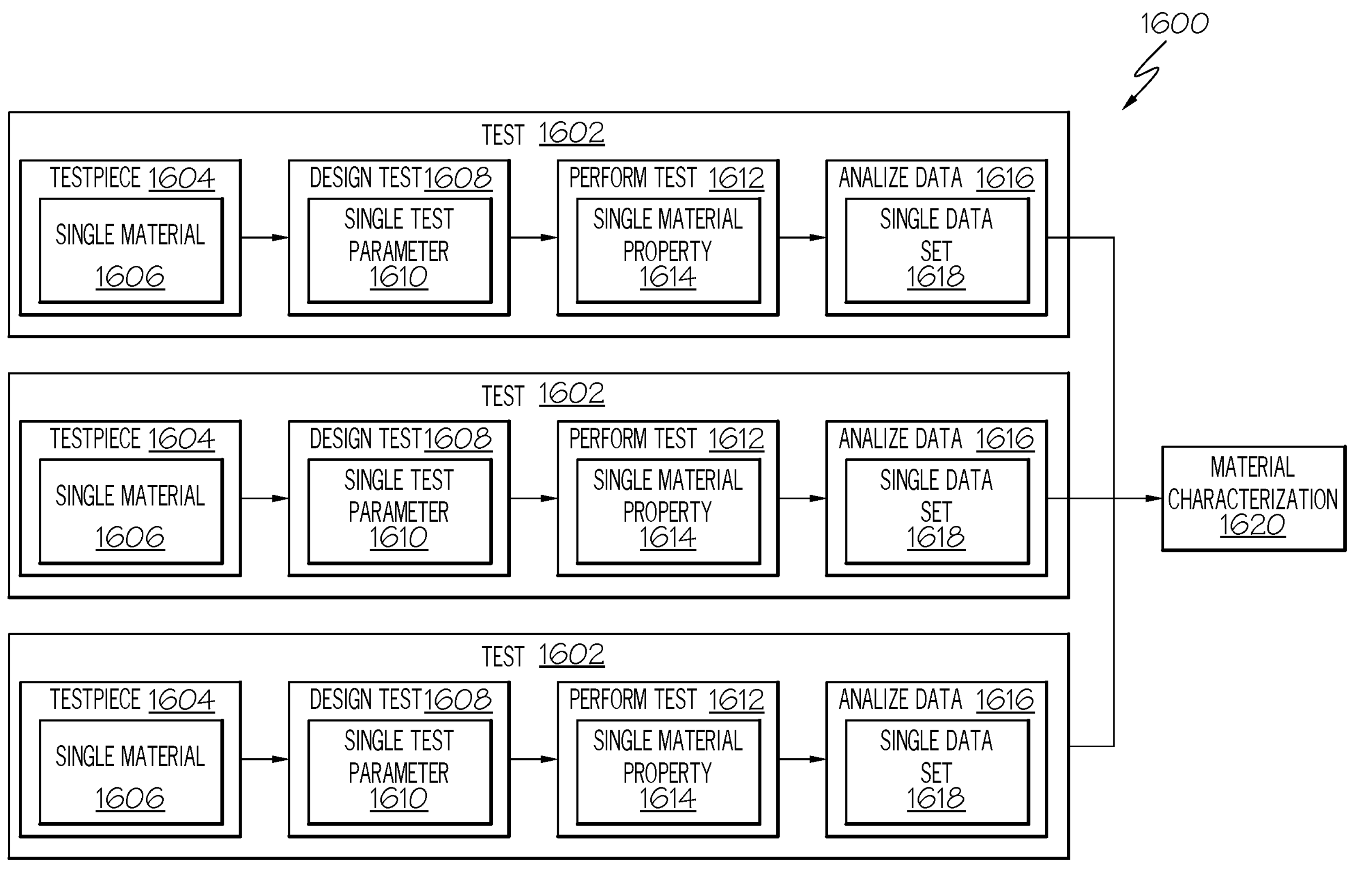
FIG. 1 is a schematic, block diagram of an example of a conventional material testing methodology.

FIG. 1 illustrates an example of a conventional testing methodology 1600 for characterizing a material. In the illustrated example, a test (block 1602) includes a single testpiece (block 1604). The testpiece is made of a single material (block 1606). The test is designed (block 1608) to operate or be performed under a single test parameter (block 1610) or condition (e.g., load state, temperature, pressure, geometry, etc.). The test is performed (block 1612) on the testpiece. As an example, the testpiece is loaded into a load frame and is subjected to a mechanical load test. During the test, a single material property (block 1614) or characteristic (strength, fatigue behavior, strain, stress, temperature effects, corrosion, etc.) is measured for the testpiece. A number of tests are performed on a number of different testpieces over a number of different test parameters. Each testpiece is made of the same material. Each test uses a different test parameter and/or measures a different material property. As such, each test provides a single data set (block 1618) that is analyzed (block 1616) and that represents a single material property of a single material under a single test parameter. After completing a number of tests, the data sets are combined to represent a material characterization (block 1620). This material characterization can be used for modelling.

The present disclosure recognizes that material characterization and modelling require a vast amount of data representing the material under a variety of different conditions, which, in turn, requires a vast number of tests to be performed. Conventional testing methodologies used for material characterization, such as that illustrated in FIG. 1, are time-consuming and expensive and are, therefore, unfeasible as the number of different material types and combinations increase and evolve.

Figure 2:
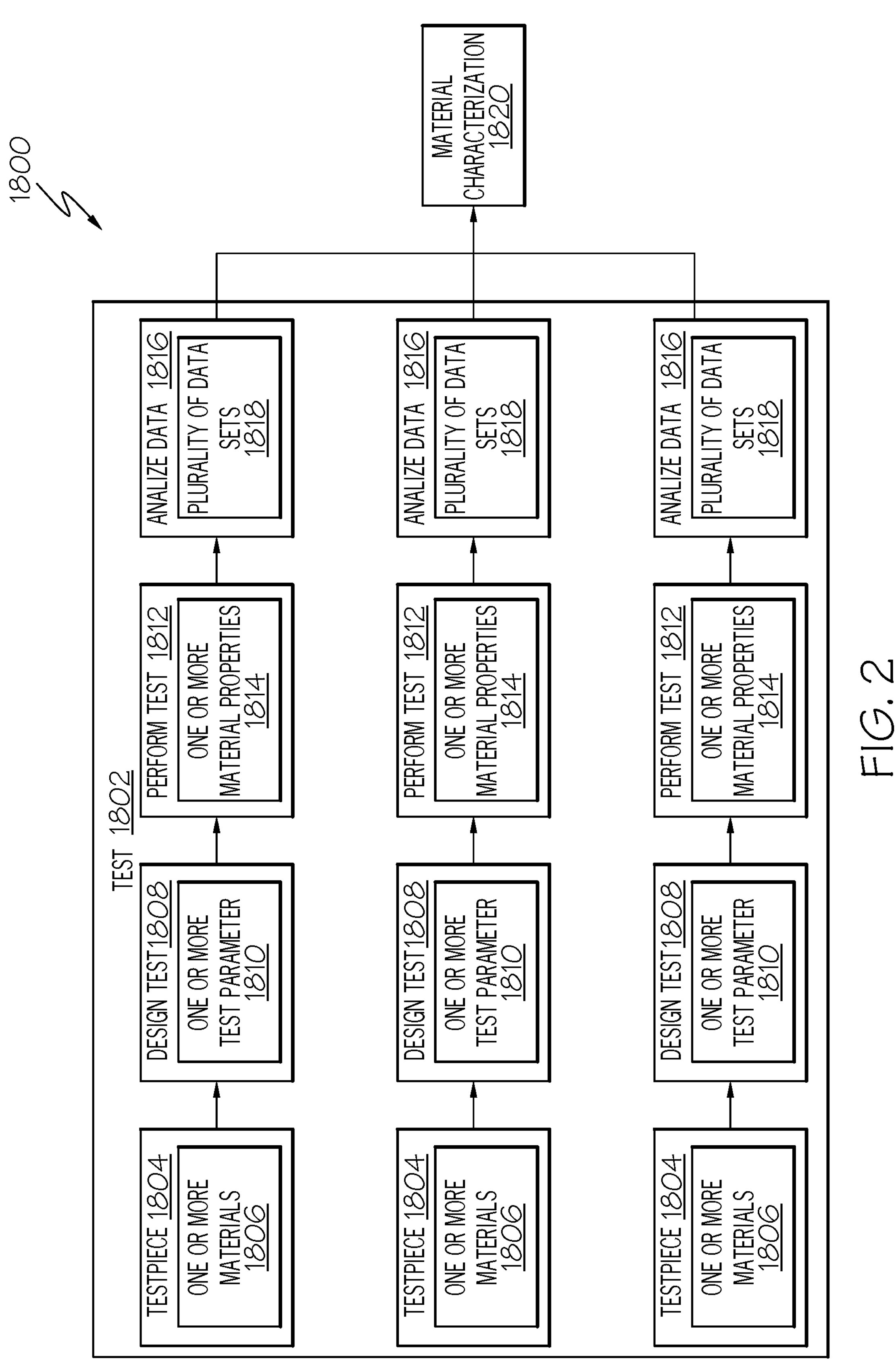
FIG. 2 is a schematic, block diagram of an example of an improved high-throughput material testing methodology.

FIG. 2 illustrates an example of an improved high-throughput testing methodology 1800 for characterizing a material, implemented using the system 100 and/or according to the method 1000 disclosed herein. The improved testing methodology overcomes the one test per one dataset bottleneck of conventional testing methodologies (e.g., FIG. 1). In the illustrated example, a test (block 1802) includes a one or more testpieces (block 1804). Each testpiece is made of one or more materials (block 1806). The test is designed (block 1808) to operate or be performed under one or more test parameters (block 1810) or condition (e.g., load state, temperature, pressure, geometry, etc.) for each testpiece or a corresponding one of the testpieces. The test can be performed (block 1812) on a plurality of testpieces concurrently. During the test, one or more material properties (block 1814) or characteristics (strength, fatigue behavior, strain, stress, temperature effects, corrosion, etc.) are measured for each testpiece. Thus, a single test can be performed on a number of different testpieces, can be performed under a variety of different test parameters, and/or can measure a variety of different material properties. As such, each test provides a plurality of data sets (block 1818) that are analyzed (block 1816) and that represent a plurality of material properties of a plurality of materials under a plurality of test parameters. After completing the test, the data sets are combined to represent a material characterization (block 1820). The material characterization can be used for modelling and/or design. As examples, modelling using the material characterization may be part of a design and analysis process for a new engineering, structures, components, and the like.

Referring now to FIGS. 3-21, the following are examples of the system 100, according to the present disclosure. The system 100 includes a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

Referring to FIGS. 3-21, in one or more examples, the system 100 includes the testpiece 102. The testpiece 102 includes a body 106 that extends along an axis 104 and a hollow interior 108 that is formed by body 106. The hollow interior 108 of the testpiece 102 is configured to be pressurized. The system 100 also includes a test bed 110. The test bed 110 internally pressurizes the hollow interior 108 of the testpiece 102. The system 100 further includes a data collector 112. The data collector 112 acquires data 114 representing the testpiece 102.

Internally pressurizing the body 106 of the testpiece 102 enables a testing load or a testing stress to be applied to the testpiece 102 using a fluid 196, rather than a mechanical test rig. Internally pressurizing the body 106 of the testpiece 102 to apply the testing load and/or stress provides the ability to load/stress a test specimen in a different fashion that enables the ability to measure a plurality of material properties in a single test that in turn can lead to improved cycle time.

Figures 4, 5:
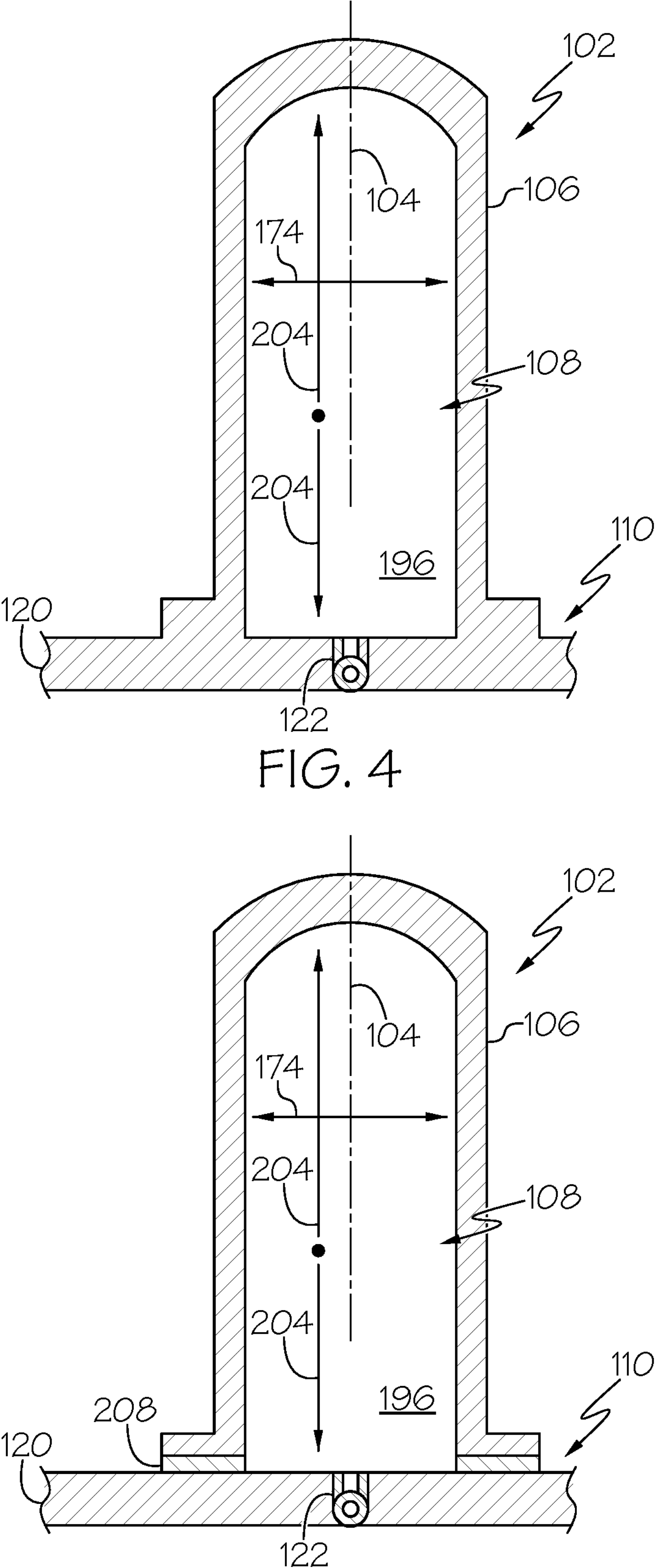
FIG. 4 is a schematic, sectional view of an example of a testpiece and a test bed.
FIG. 5 is a schematic, sectional view of an example of the testpiece and the test bed.

Referring to FIGS. 4 and 5, in one or more examples, the test bed 110 is configured to seal the hollow interior 108 of the testpiece 102 and to apply the fluid 196 within the hollow interior 108 of the testpiece 102 during the testing operation.

Figure 21:
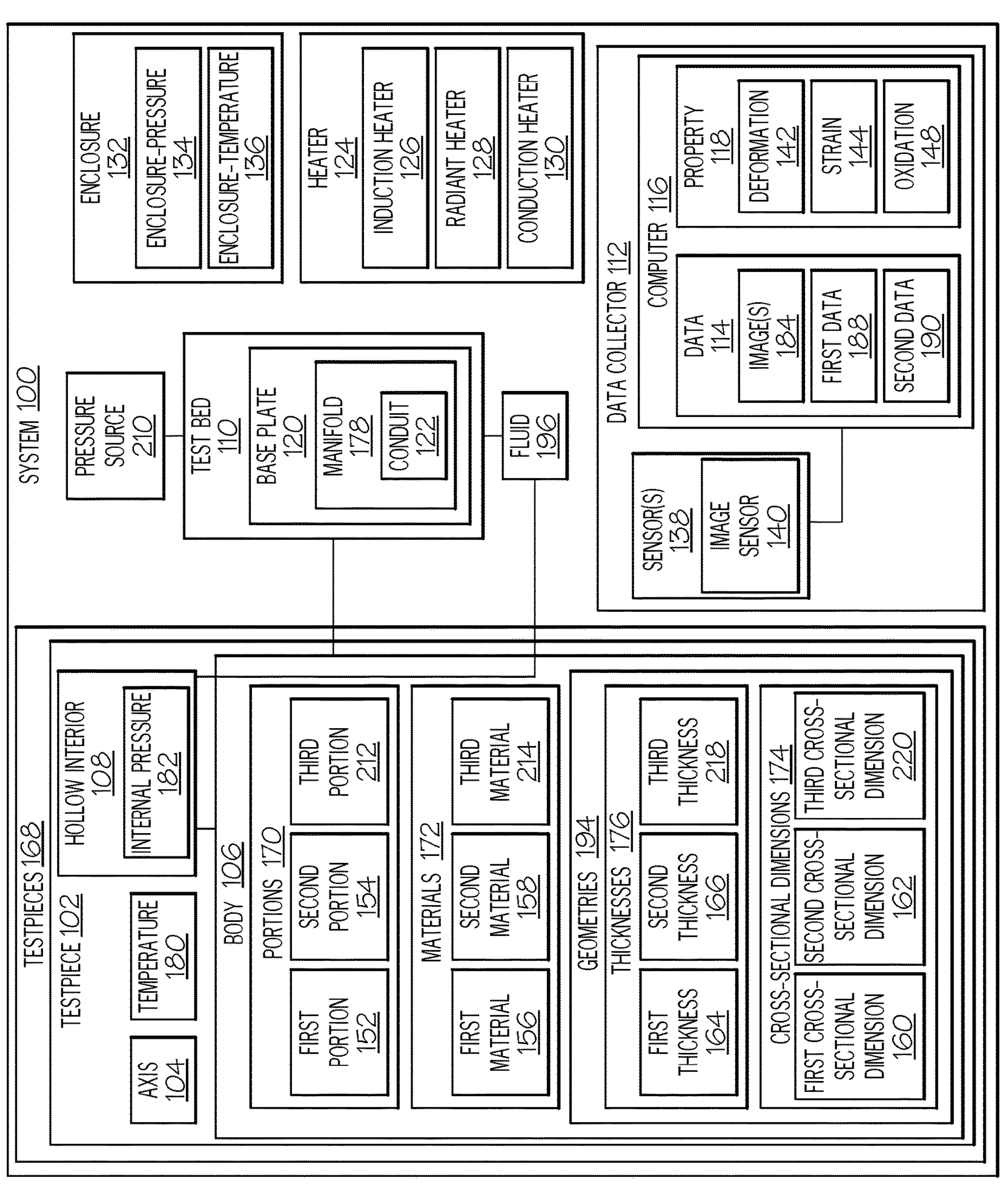
FIG. 21 is a schematic, block diagram of an example of the system.

Referring to FIGS. 4 and 21, in one or more examples, the testpiece 102 is formed or otherwise fabricated by additive manufacturing. As an example, the body 106, including or forming the hollow interior 108, is formed by additive manufacturing. Additive manufacturing enables the testpiece 102 to be easily manufactured with various selectively controlled characteristics. As an example, the body 106 of the testpiece 102 can be made of one or more different types of materials 172. As another example, the body 106 of the testpiece 102 can be made to include one or more different thicknesses 176. As another example, the body 106 of the testpiece 102 can be made to include one or more different cross-sectional dimensions 174. While additive manufacturing offers particular benefits, the testpiece 102 can also be made of any other suitable manufacturing technique.

Referring to FIGS. 3 and 17-21, in one or more examples, the data collector 112 includes a sensor 138. The sensor 138 collects the data 114. In one or more examples, the data collector 112 also includes a computer 116. The computer 116 determines at least one property 118 of the testpiece 102 based on the data 114 collected by the sensor 138.

The sensor 138 includes or takes the form of any device that detects a condition or change in the testpiece 102 and sends information representing the condition or change to another electronic device (e.g., computer 116) for processing and/or analysis. The sensor 138 can be a contact sensor or a non-contact sensor. In one or more examples, the data collector 112 includes a plurality of sensors 138. In these examples, all of the sensors 138 can be the same or the data collector 112 can utilize a variety of different types of the sensors 138 to acquire different types of data 114, for example, representing different properties 118. In one or more examples, the computer 116 includes a data processing system having at least one processor and memory storing instructions (e.g., program code) that, when executed, cause the processor to analyze the data 114, provided by the sensor 138, and determine one or more properties 118 of the material 172 of the testpiece 102.

Referring to FIGS. 3 and 17-21, in one or more examples, the sensor 138 includes an image sensor 140, such as a camera, a charge coupled device (CCD), complementary metal oxide semiconductor (CMOS), and the like. In these examples, the image sensor 140 captures one or more images 184 (e.g., the data 114 is image data) representing the testpiece 102 before, during, and/or after the test. In these examples, the computer 116 determines deformation 142 (e.g., displacement) and strain 144 (e.g., properties 118) of the testpiece 102 using the images 184.

In one or more examples, the computer 116 determines the deformation 142 and the strain 144 of the testpiece 102 using digital image correlation (DIC). Generally, digital image correlation is an optical technique that combines image registration and tracking methods for accurate two-dimensional (2D) and three-dimensional (3D) measurements of changes in the images 184. Compared to strain gauges and extensometers, digital image correlation methods provide finer details about deformation, due to the ability to provide both local and average data. Use of the image sensor 140 and DIC techniques enables a majority or an entirety of the exterior surface of the body 106 of the testpiece 102 to be measured during testing.

In other examples, the sensor 138 includes strain gauges and/or extensometers. In these examples, the computer 116 determines the deformation 142 and the strain 144 (e.g., properties 118) of the testpiece 102 using the data 114 provided by the strain gauges and/or extensometers.

In one or more examples, the data collector 112 detects and/or measures radial expansion of the testpiece 102 or changes in the geometry of the body 106 of the testpiece 102, for example, in a direction at least approximately perpendicular to the axis 104. In one or more examples, the data collector 112 detects and/or measures axial elongation of the testpiece 102 or changes in the geometry of the body 106 of the testpiece 102, for example, in one or more directions, such as, for example, in a direction at least approximately parallel to or oblique to the axis 104.

Figure 3:
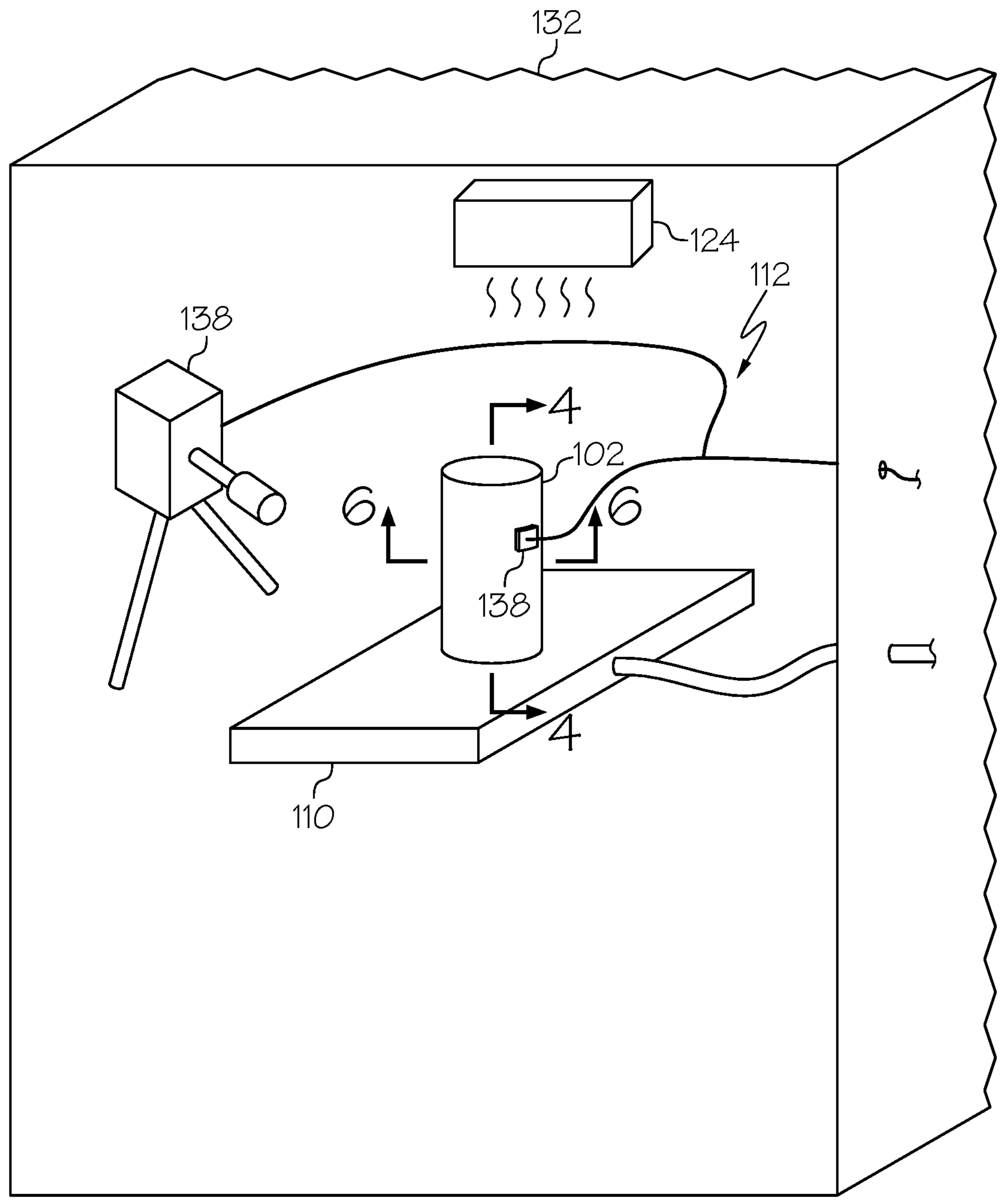
FIG. 3 is a schematic illustration of an example of a system for material testing.
Figure 17:
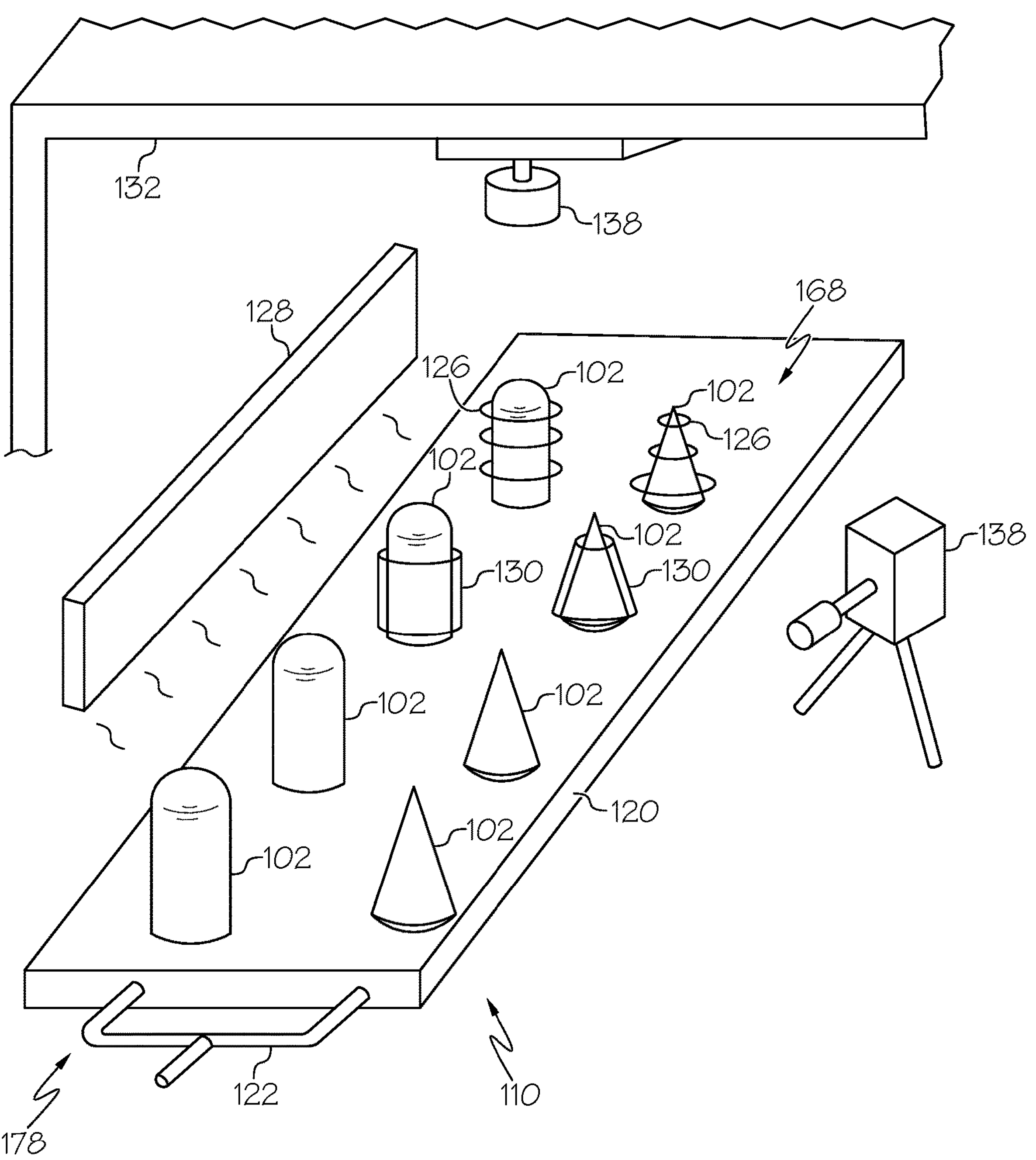
FIG. 17 is a schematic illustration of an example of a portion of the system.

Referring to FIGS. 3, 17 and 21, in one or more examples, the sensor 138 includes any one of various other types of sensors that is configured to or capable of measuring or detecting one or more of the properties 118. In one or more examples, the computer 116 determines oxidation 148 (e.g., property 118) of the testpiece 102 using the data 114 provided by the sensor 138.

In addition to the examples provided herein above, other examples of the sensor 138 include, but are not limited to, Raman spectroscopy, ultrasonic transducers, X-ray Absorption Near Edge Spectroscopy (XANES), and the like. Still other examples of the sensor 138 include, but are not limited to, thermal cameras, Linear Variable Differential Transformer (LVDT) transducers, laser interferometry systems, strain gauges, thermocouples, acoustic emission, non-contact pyrometers, extensometers, ultrasound phase arrays, and the like.

In additional to the examples provided herein above, other examples of the properties 118 being detected, measured, and/or determined using the data collector 112 (e.g., one or more sensors 138 and the computer 116) include, but are not limited to, creep and fatigue data, which is measuring displacement and/or strain information as a function of load and time, thermal conductivity, thermal expansion measurements, and the like. Still other examples of the properties 118 include, but are not limited to, magnetic properties, electrical properties, phase transformation, and deformation twinning activation (e.g., from acoustic emission).

Referring to FIGS. 3-5 and 17-21, in one or more examples, the test bed 110 includes a base plate 120. The base plate 120 supports the testpiece 102. The test bed 110 also includes a conduit 122 that extends through the base plate 120. The conduit 122 is in fluid communication with the hollow interior 108 of the testpiece 102.

In one or more examples, the body 106 of the testpiece 102 and the base plate 120 of the test bed 110 are connected such that the base plate 120 seals the interior 108 of the testpiece 102. The conduit 122 provides the fluid 196 to the interior 108 sealed by the body 106 and the base plate 120. Introduction of the fluid 196 internally pressurizes the body 106 and, thus, applies a load, force, or stress on the testpiece 102.

Figure 6:
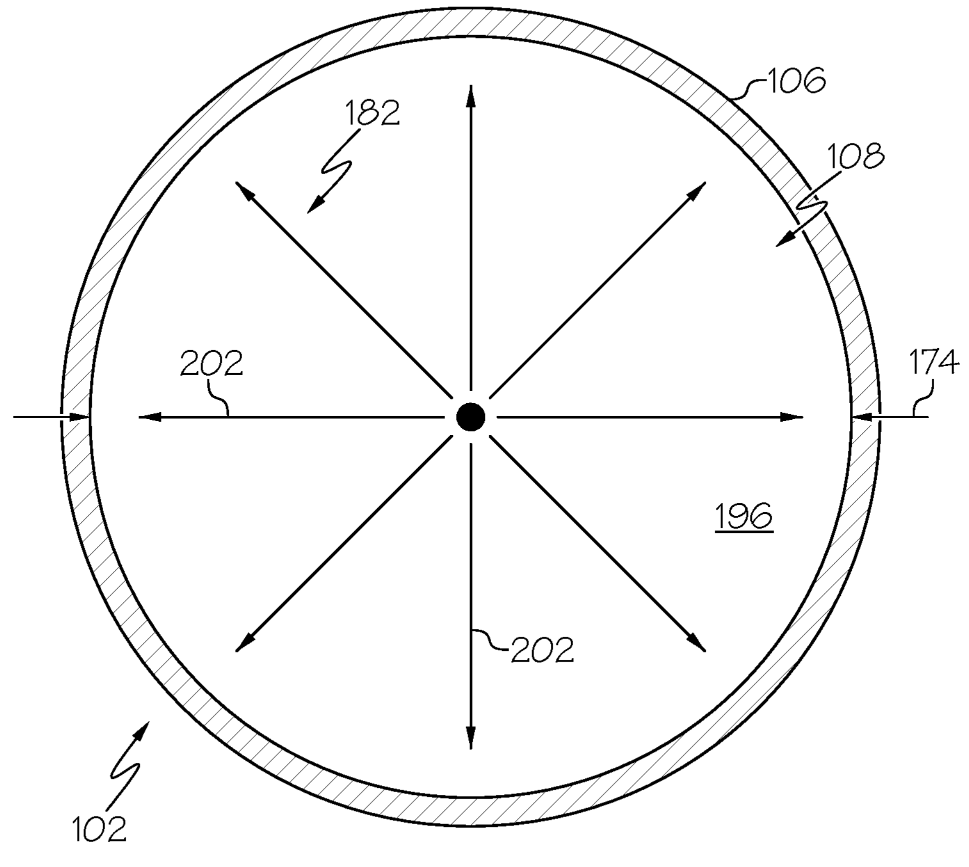
FIG. 6 is a schematic, sectional view of an example of the testpiece.
Figures 7, 8:
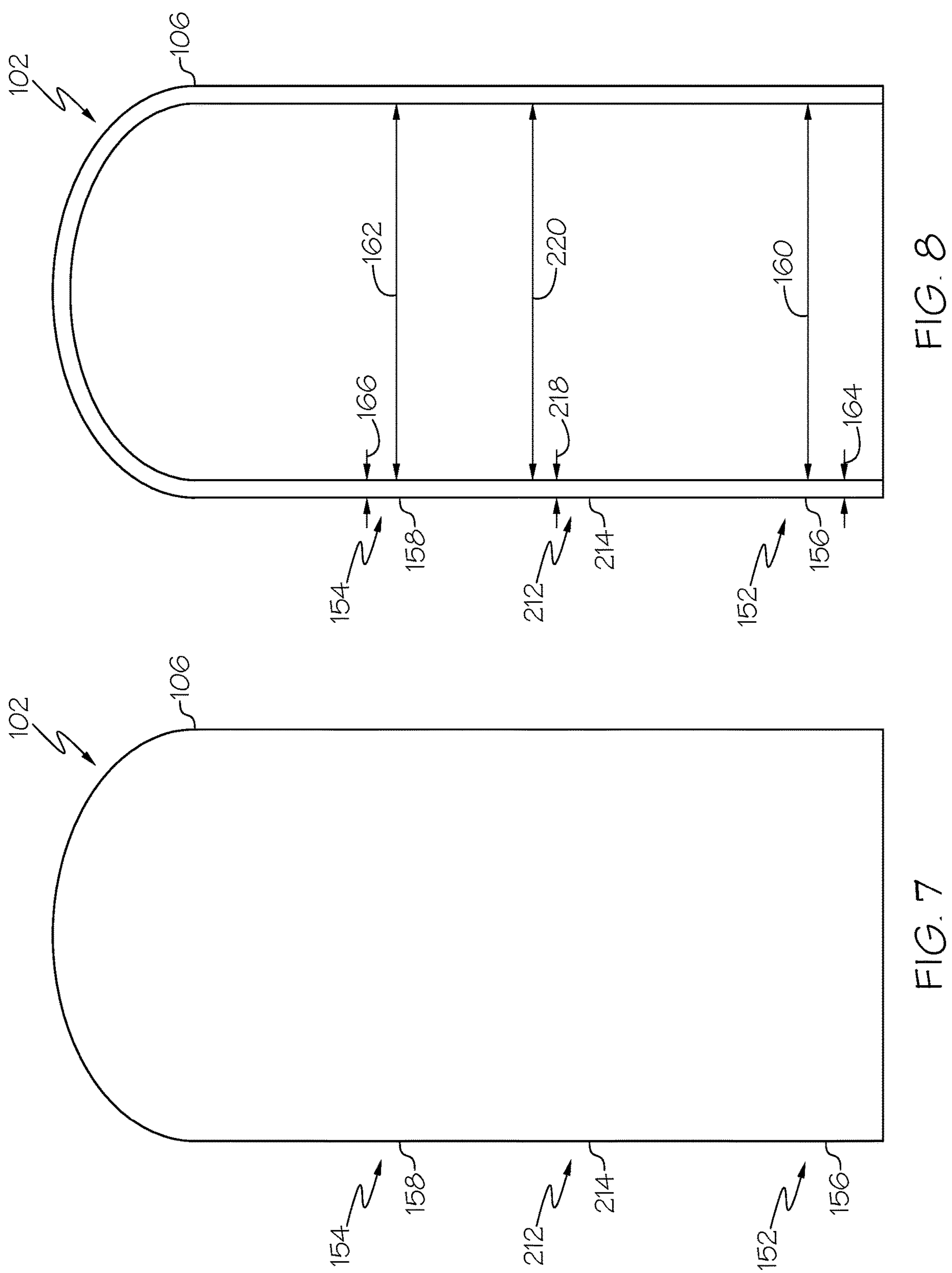
FIG. 7 is a schematic, elevational view of an example of the testpiece.
FIG. 8 is a schematic, sectional view of an example of the testpiece of FIG. 7.
Figures 9, 10:
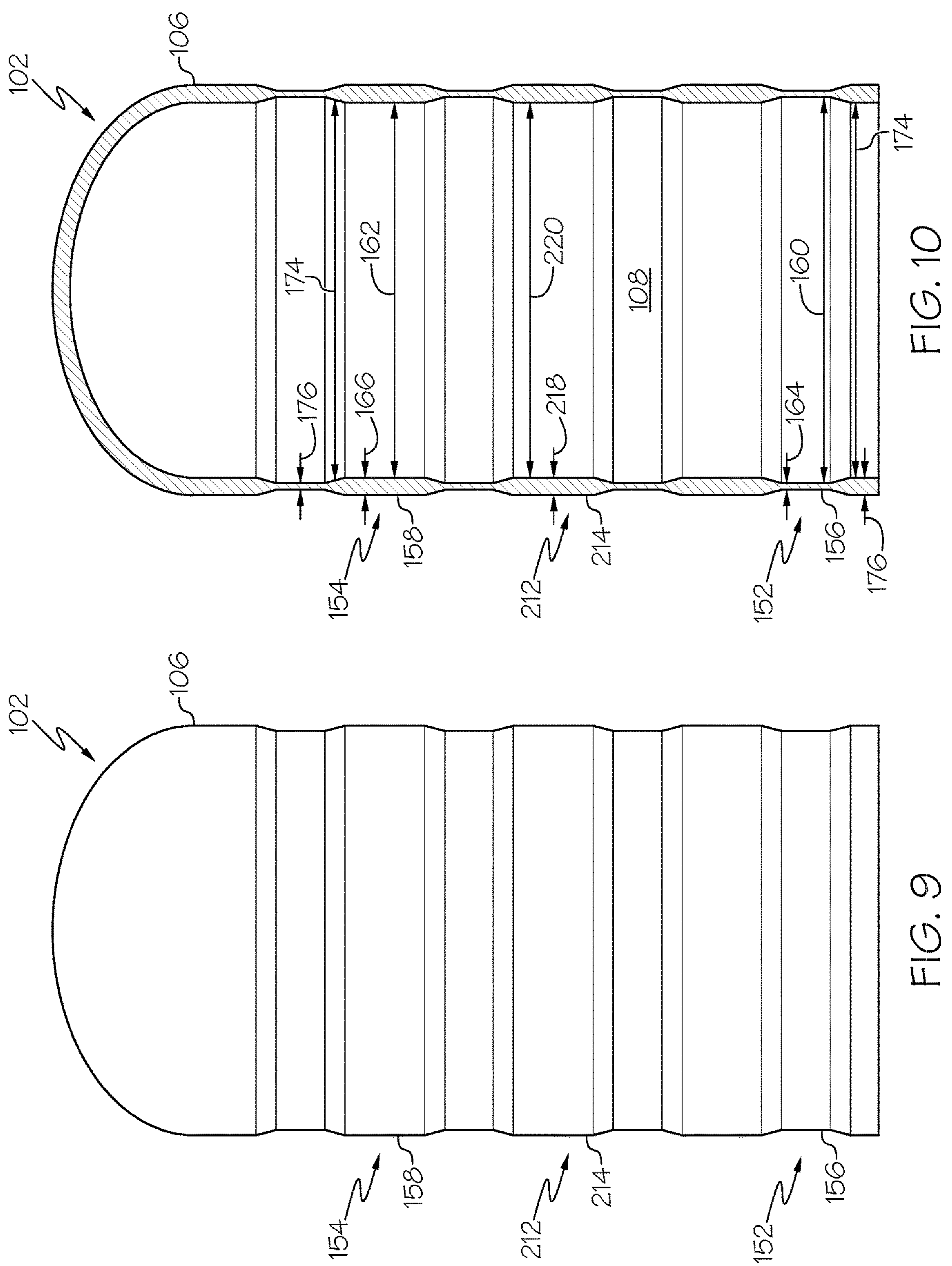
FIG. 9 is a schematic, elevational view of an example of the testpiece.
FIG. 10 is a schematic, sectional view of an example of the testpiece of FIG. 9.
Figure 12:
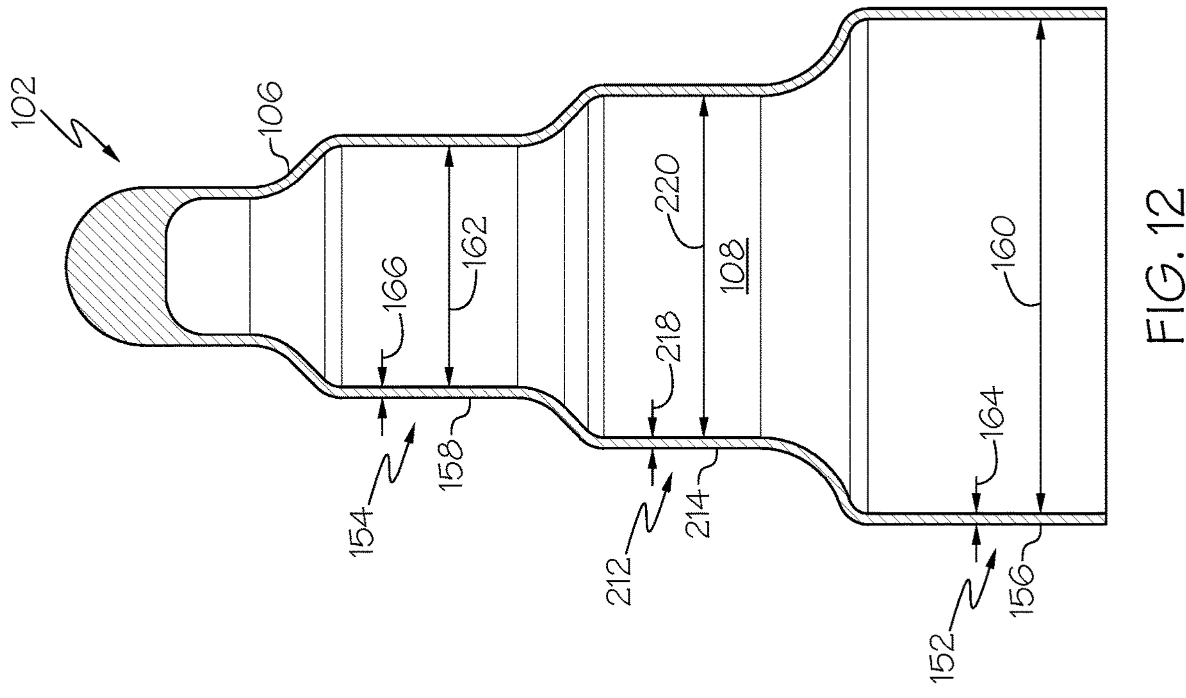
FIG. 12 is a schematic, sectional view of an example of the testpiece of FIG. 11.
Figure 11:
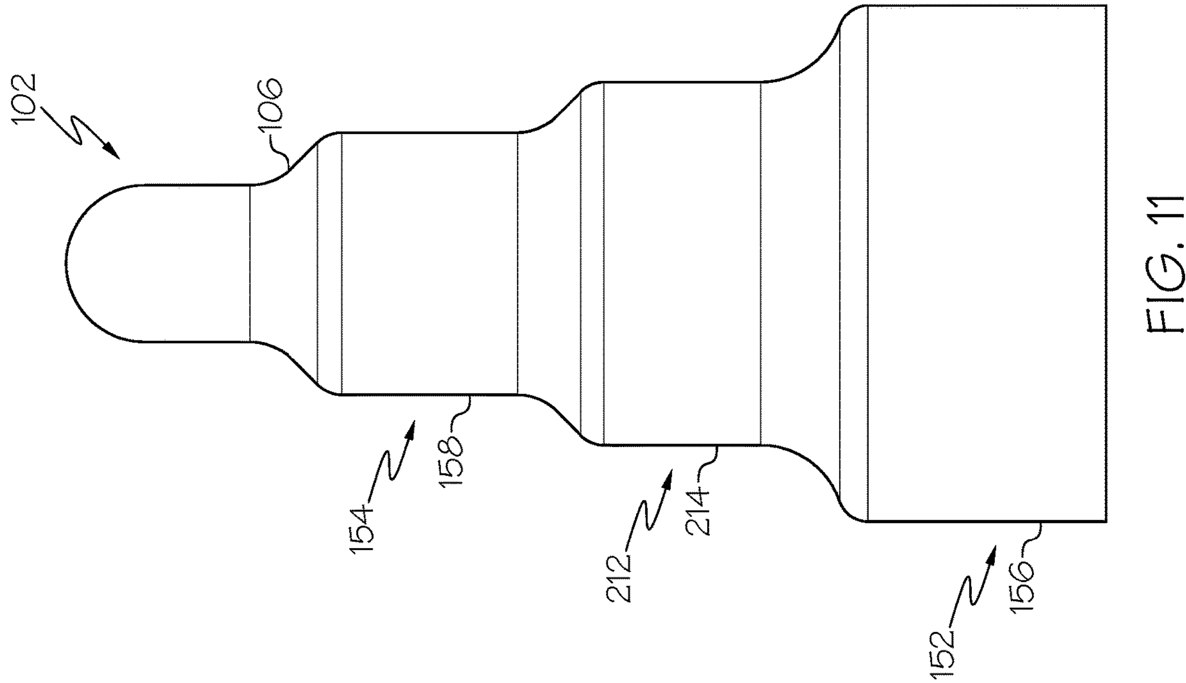
FIG. 11 is a schematic, elevational view of an example of the testpiece.
Figures 13, 14:
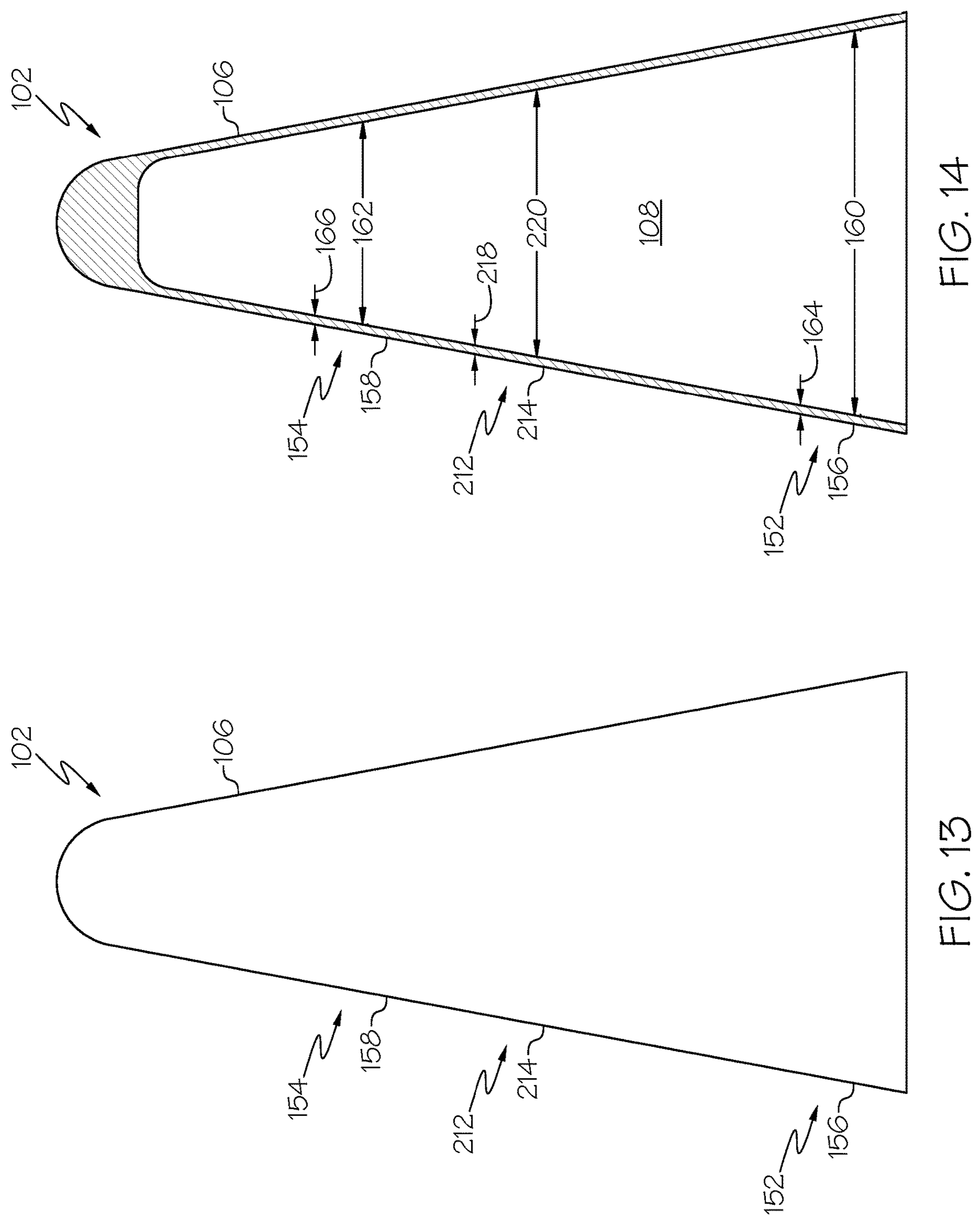
FIG. 13 is a schematic, elevational view of an example of the testpiece.
FIG. 14 is a schematic, sectional view of an example of the testpiece of FIG. 13.
Figure 16:
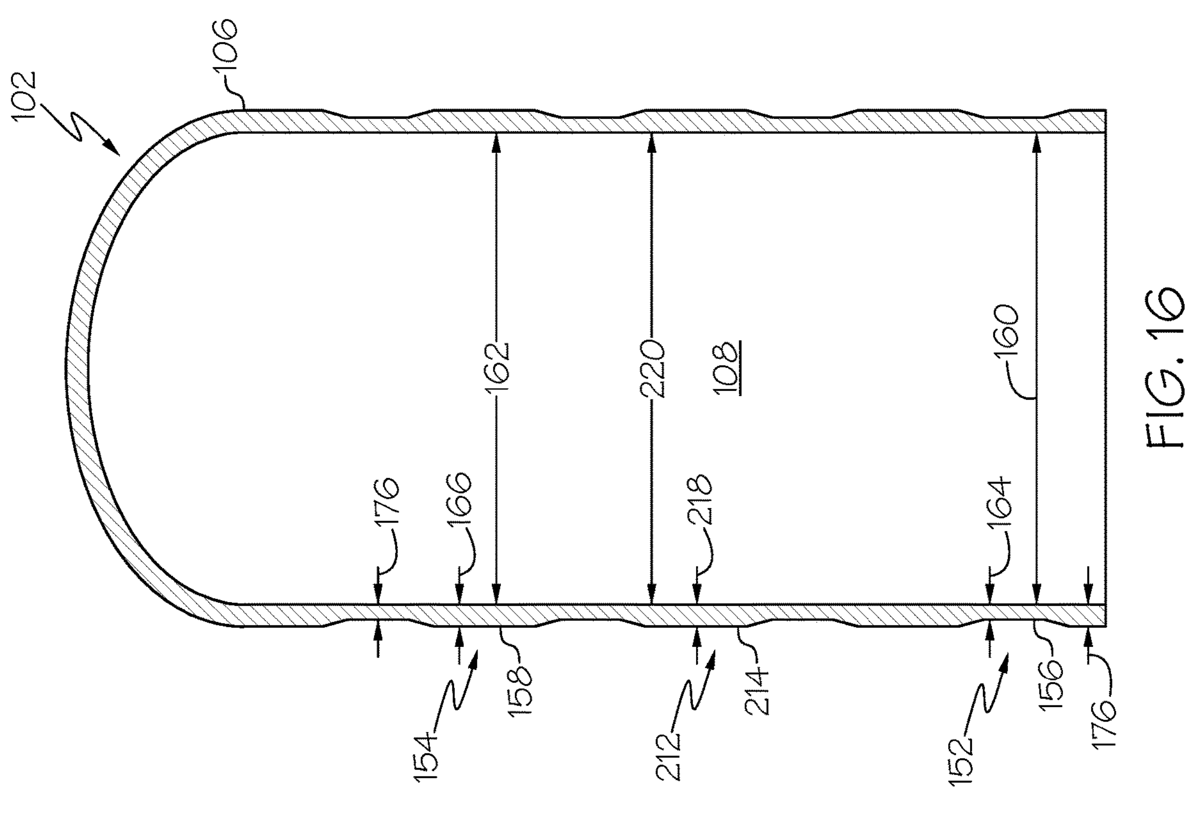
FIG. 16 is a schematic, sectional view of an example of the testpiece.
Figure 15:
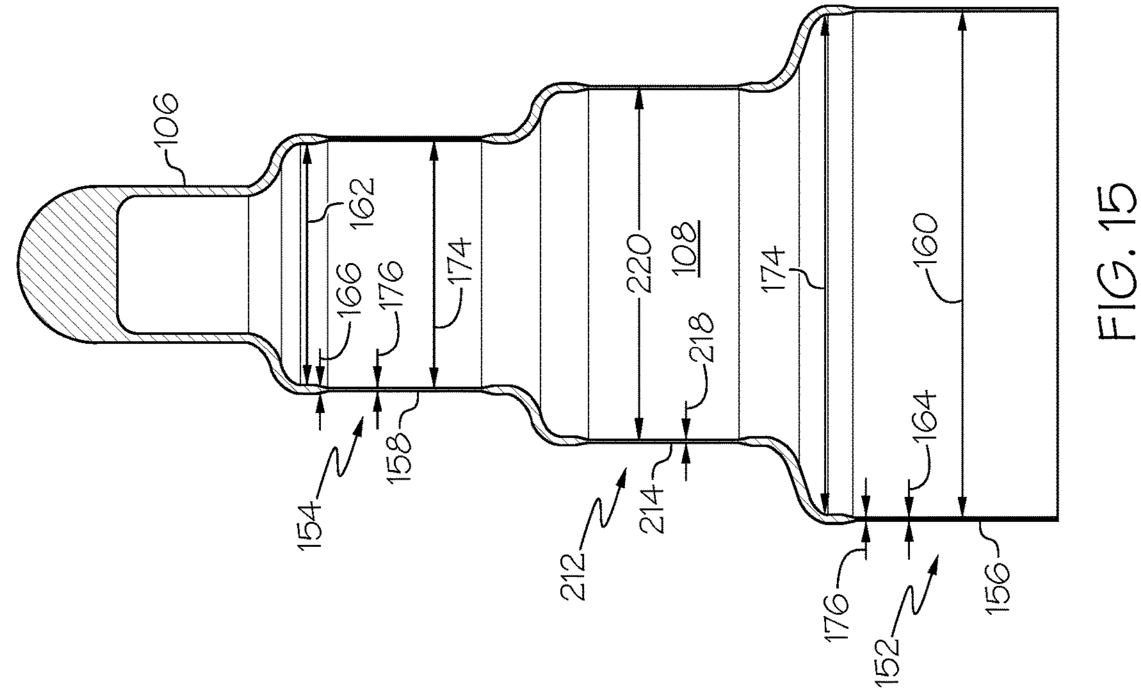
FIG. 15 is a schematic, sectional view of an example of the testpiece.

Referring to FIGS. 4-6, introduction of the fluid 196 within the interior 108 of the testpiece 102 increases the internal pressure 182 with the testpiece 102. In turn, the internal pressure 182 applies a load, force, or stress against an interior surface of the body 106 in a radially outward direction indicated by directional arrows 202 in FIG. 6. The internal pressure 182 also applies a load, force, or stress against the interior surface of the body 106 and an interior surface of the base plate 120 in an axially outward direction indicated by directional arrows 204 in FIGS. 4 and 5.

Referring to FIGS. 3 and 21, in one or more examples, the system 100 includes a pressure source 210 that pressurizes the fluid 196, provides the fluid 196 to the interior 108 of the testpiece 102, and/or controls the internal pressure 182 within the interior 108 of the testpiece 102. In one or more examples, the pressure source 210 is coupled to and is in fluid communication with the conduit 122 of the test bed 110 via a fluid tube to deliver the fluid 196 within the interior 108 during the test.

Controlling delivery of the fluid 196 and/or the pressure of the fluid 196 within the interior 108 of the testpiece 102 enables selective control of the internal pressure 182 of the testpiece 102 during the test. In these examples, the internal pressure 182 is an example of one of a plurality of parameters (e.g., block 1810 in FIG. 2) that is controlled by the system 100 during the test.

Referring to FIGS. 4 and 21, in one or more examples, the testpiece 102 and the test bed 110 are formed or otherwise fabricated by additive manufacturing. As an example, the body 106, including or forming the hollow interior 108, and the base plate 120 including the internally formed conduit 122, is formed by additive manufacturing. Additive manufacturing enables the testpiece 102 and the test bed 110 to form a single, monolithic structure, thereby providing a more stable seal to the interior 108 of the testpiece 102. Additive manufacturing also enables the testpiece 102 and the test bed 110 to be easily manufactured with various selectively controlled characteristics. While additive manufacturing offers particular benefits, the testpiece 102 and/or the test bed 110 can also be made of any other suitable manufacturing technique.

Referring to FIGS. 5 and 21, in one or more examples, the testpiece 102 is coupled to the test bed 110. As an example, the body 106 of the testpiece 102 is coupled to the base plate 120 of the test bed 110 by any mechanism or technique suitable to seal the interior 108 of the testpiece 102 to be internally pressurized during the test. In one or more examples, the testpiece 102 includes a flange that extends from the body 106. The flange is coupled to the base plate 120 of the test bed 110, for example, by welding, adhesive bonding, mechanical fasteners, and the like or combinations thereof. In one or more examples, the test bed 110 includes a seal 208, such as a gasket, that is disposed between the body 106 and the base plate 120.

Referring to FIGS. 3, 17 and 21, in one or more examples, the system 100 includes a heater 124. The heater 124 heats the testpiece 102. Heating the testpiece 102 enables selective control of a temperature 180 of the testpiece 102 during the test. In these examples, the temperature 180 is an example of one of the parameters that is controlled by the system 100.

Referring to FIGS. 17-21, in one or more examples, the heater 124 includes an induction heater 126. In one or more examples, the induction heater 126 (e.g., an induction coil) is located around at least a portion of the body 106 of the testpiece 102. An alternating current (AC) is used to create a magnetic field that penetrates and heats an electrically conductive material of the testpiece 102. Advantages of the use of the induction heater 126 include localized, constant, and precise heating at particular locations of the testpiece 102. Other advantages of the use of the induction heater 126 include improved heating efficiency, improved temperature control, improved heating performance, and energy efficiency.

Referring to FIGS. 17 and 21, in one or more examples, the heater 124 includes a radiant heater 128. In one or more examples, the radiant heater 128 is located proximate (e.g., at or near) at least a portion of the body 106 of the testpiece 102. Advantages of the use of the radiant heater 128 include energy efficiency, simplicity, and consistent temperature application to an entirety of the body 106 of the testpiece 102.

Referring to FIGS. 17 and 21, in one or more examples, the heater 124 includes a conduction heater 130. In one or more examples, the conduction heater 130 (e.g., a heat blanket, heat tape, etc.) is located on at least a portion of the interior surface and/or the exterior surface of the body 106 and/or is located on at least a portion of the base plate 120 of the test bed 110. Advantages of the use of the conduction heater 130 include rapid heating and/or implementation of thermal gradients along the base plate 120 and/or the testpiece 102, for example, due to heat transfer through the testpiece 102 (out from the contact surface) and the distance from the conduction heater 130.

Referring to FIGS. 3 and 17-21, in one or more examples, the system 100 includes an enclosure 132. The enclosure 132 encloses the testpiece 102. In one or more examples, the testpiece 102, the test bed 110, and the enclosure 132 of the data collector 112 are located within the enclosure 132 during the test. In one or more examples, the enclosure 132 provides a safety barrier in the case of a failure in the testpiece 102 during internal pressurization.

Referring to FIGS. 18-21, in one or more examples, an enclosure-pressure 134 within the enclosure 132 is controllable. For example, the enclosure 132 can take the form of an autoclave or other pressurizable vessel. Controlling the enclosure-pressure 134 (e.g., pressurizing or depressurizing an interior of the enclosure 132) enables selective control of the external pressure surrounding the body 106 of the testpiece 102 during the test. In these examples, the enclosure-pressure 134 (e.g., external pressure) is an example of one of the parameters that is controlled by the system 100 during the test.

Referring to FIGS. 18-21, in one or more examples, an enclosure-temperature 136 within the enclosure 132 is controllable. For example, the enclosure 132 can take the form of an autoclave or an oven. Controlling the enclosure-temperature 136 (e.g., heating or cooling an interior of the enclosure 132) enables selective control of the external temperature surrounding the body 106 of the testpiece 102 during the test. In these examples, the enclosure-temperature 136 (e.g., external temperature) is an example of one of the parameters that is controlled by the system 100 during the test.

Referring to FIGS. 7-16 and 21, in one or more examples, the body 106 of the testpiece 102 includes a plurality of portions 170, such as at least two portions 170. In one or more examples, the portions 170 are connected to each other or extend from each other along the axis 104. In one or more examples, at least one of the portions 170 includes a material 172 that that different than the material 172 of at least another one of the portions 170. In one or more examples, at least one of the portions 170 includes a cross-sectional dimension 174 that is different than the cross-sectional dimension 174 of at least another one of the portions 170. In one or more examples, at least one of the portions 170 includes a thickness 176 that is different that the thickness 176 of at least another one of the portions 170. In one or more examples, the portions 170 include at least one of materials 172 that are different, cross-sectional dimensions 174 that are different, and thicknesses 176 that are different.

Referring to FIGS. 7-16 and 21, in one or more examples, the body 106 of the testpiece 102 includes a first portion 152 that extends along the axis 104. The body 106 also includes a second portion 154 that extends from the first portion 152 along the axis 104. The first portion 152 and the second portion 154 are examples of the portions 170. While only two portions are explicitly identified, it can be appreciated that the body 106 of the testpiece 102 can include any number of additional portions 170 (e.g., a third portion, a fourth portion, etc.)

Referring to FIGS. 7-16 and 21, in one or more examples, the first portion 152 includes a first material 156. The second portion 154 includes a second material 158. In one or more examples, the first material 156 and the second material 158 are different. The first material 156 and the second material 158 are examples of the materials 172.

The materials 172 making up the portions 170 of the body 106 of the testpiece 102, such as the first material 156 of the first portion 152 and the second material 158 of the second portion 154, can include any suitable material, including, but not limited to, metallic materials, metallic alloys, polymeric materials, ceramic materials, and the like and combinations thereof. In one or more examples, the materials 172 include complex concentrated alloys (CCA). In one or more examples, the materials 172 include high entropy alloys (HEA).

In one or more examples, the portions 170 include at least a third portion 212. In one or more examples, the third portion 212 includes a third material 214. In one or more examples, the third portion 212 extends along the axis 104 between the first portion 152 and the second portion 154. In one or more examples, the third material 214 of the third portion 212 is different than the first material 156 of the first portion 152 and the second material 158 of the second portion 154. In one or more examples, the third material 214 of the third portion 212 includes a combination or mixture of the first material 156 and the second material 158. As an example, the third material 214 of the third portion 212 forms a material gradient between the first material 156 of the first portion 152 and the second material 158 of the second portion 154.

The testpiece 102 being made of a plurality of materials 172, such as the body 106 of the testpiece 102 having a plurality of portions 170 and each of the portions 170 being made of a different material 172 enables a number of different materials 172 to be evaluated during a single test operation and/or by using a single testpiece 102.

Referring to FIGS. 7-16 and 21, in one or more examples, the first portion 152 includes a first cross-sectional dimension 160. The second portion 154 includes a second cross-sectional dimension 162. In one or more examples, the first cross-sectional dimension 160 and the second cross-sectional dimension 162 are different. The first cross-sectional dimension 160 and the second cross-sectional dimension 162 are examples of the cross-sectional dimensions 174.

The present disclosure recognizes that the load or stress applied to the body 106 of the testpiece 102 depends upon the internal pressure 182 within the interior 108 of the testpiece 102 and the cross-sectional dimension 174 of the testpiece 102. As an example, with the internal pressure 182 within the testpiece 102 being constant (e.g., being applied at a constant value or magnitude), the load or stress applied to or acting on the body 106 of the testpiece 102 corresponds to the cross-sectional dimension 174 of the testpiece 102. As examples, at a constant value of the internal pressure 182, the load or stress acting on the body 106 increases as the cross-sectional dimension 174 decreases and decreases as the cross-sectional dimension 174 increases.

In one or more examples, the portions 170 include at least the third portion 212. In one or more examples, the third portion 212 includes a third cross-sectional dimension 220. In one or more examples, the third cross-sectional dimension 220 is different than at least one of the first cross-sectional dimension 160 and the second cross-sectional dimension 162. In one or more examples, the third cross-sectional dimension 220 of the third portion 212 forms a transitional cross-sectional dimension between the first cross-sectional dimension 160 of the first portion 152 and the second cross-sectional dimension 162 of the second portion 154.

The testpiece 102 being made with a plurality of cross-sectional dimensions 174, such as the body 106 of the testpiece 102 having a plurality of portions 170 and each of the portions 170 having a different cross-sectional dimension 174 enables a single material 172 to be evaluated at a number of different load or stress states and/or a number of different materials 172 to be evaluated at a number of different load or stress states during a single test operation and/or by using a single testpiece 102.

The cross-sectional dimension 174 of the testpiece 102, such as the different cross-sectional dimensions 174 of the portions 170 of the body 106 can be controlled in any one or more of various ways. In one or more examples, as illustrated in FIGS. 11-15, the cross-sectional dimension 174 of the testpiece 102 is controlled using the shape of the body 106. As an example, the body 106 can include a conical shape (e.g., FIGS. 13 and 14) having a cross-sectional dimension that progressively decreases along the axis 104. As another example, the body 106 can include a series of cylindrical-shaped sections (e.g., FIGS. 11, 12 and 15), each having a progressively smaller cross-sectional dimension. In one or more examples, as illustrated in FIGS. 9, 10, 15 and 16), the cross-sectional dimension 174 of the testpiece 102 is controlled using the thickness 176 of the body 106.

Referring to FIGS. 7-16 and 21, in one or more examples, the first portion 152 includes a first thickness 164. The second portion 154 includes a second thickness 166. In one or more examples, the first thickness 164 and the second thickness 166 are different. The first thickness 164 and the second thickness 166 are examples of the thicknesses 176.

In one or more examples, the portions 170 include at least the third portion 212. In one or more examples, the third portion 212 includes a third thickness 218. In one or more examples, the third thickness 218 is different than at least one of the first thickness 164 and the second thickness 166. In one or more examples, the third thickness 218 of the third portion 212 forms a transitional thickness between the first thickness 164 of the first portion 152 and the second thickness 166 of the second portion 154.

The testpiece 102 being made with a plurality of thicknesses 176, such as the body 106 of the testpiece 102 having a plurality of portions 170 and each of the portions 170 having a different thickness 176 enables a single material 172 to be evaluated at a number of different thicknesses 176 and/or at a number of different cross-sectional dimensions 174 (e.g., load or stress states) and/or a number of different materials 172 to be evaluated at a number of different thicknesses 176 and/or at a number of different cross-sectional dimensions 174 (e.g., load or stress states) during a single test operation and by using a single testpiece 102.

Referring to FIGS. 7-16 and 21, in one or more examples, the first portion 152 includes at least one of the first material 156, the first cross-sectional dimension 160, and the first thickness 164. The second portion 154 includes at least one of the second material 158, the second cross-sectional dimension 162, and the second thickness 166. At least one of the first material 156 and the second material 158, the first cross-sectional dimension 160 and the second cross-sectional dimension 162, and the first thickness 164 and the second thickness 166 are different.

In one or more examples, the third portion 212 includes at least one of the third material 214, the third cross-sectional dimension 220, and the third thickness 218. At least one of the first material 156, the second material 158, the third material 214; the first cross-sectional dimension 160, the second cross-sectional dimension 162, and the third cross-sectional dimension 220; and the first thickness 164, the second thickness 166, and the third thickness 218 are different.

In other examples, the testpiece 102 can have any suitable number of portions 170, be made of any suitable number of different materials 172, have any suitable three-dimensional shape, have any suitable number of different cross-sectional dimensions 174, and/or have any suitable number of different thicknesses 176.

Additionally, in other examples, any one or more of the portions 170 of the testpiece 102 can be made of any suitable number of different materials 172, have any suitable number of different cross-sectional dimensions 174, and/or have any suitable number of different thicknesses 176. Furthermore, the three-dimensional shape of the testpiece 102 (e.g., the number of cross-sectional dimensions) can vary and/or be tailored to create a desired state of stress.

Referring to FIGS. 17-21, in one or more examples, the system 100 includes a plurality of testpieces 168. The testpiece 102 (e.g., FIGS. 3-16) is an example or any one of the testpieces 168. Each one of the testpieces 168 (e.g., testpiece 102) includes the body 106 and the hollow interior 108. The test bed 110 internally pressurizes the hollow interior 108 of each one of the testpieces 168. The data collector 112 acquires the data 114 that represents each one of the testpieces 168. Utilization of the plurality of testpieces 168 during a single test operation enables high-throughput testing.

Referring to FIGS. 4-21, in one or more examples, the body 106 of each one of the testpieces 168 includes at least two portions 170. The at least two portions 170 include at least one of the materials 172 that are different, the cross-sectional dimensions 174 that are different, and/or the thicknesses 176 that are different.

Referring to FIGS. 17-21, in one or more examples, the test bed 110 includes the base plate 120. The base plate 120 supports the testpieces 168. The test bed 110 includes a manifold 178 that extends through the base plate 120. The manifold 178 is in fluid communication with the hollow interior 108 of each one of the testpieces 168. In one or more examples, the manifold 178 includes the conduit 122 that branches into several different sections to internally pressurize each one of the testpieces 168.

Referring now to FIGS. 4-21, the following are examples of the testpiece 102, according to the present disclosure. The testpiece 102 includes a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

In one or more examples, the testpiece 102 includes the body 106. The body 106 extends along the axis 104. The testpiece 102 includes the hollow interior 108. The hollow interior 108 of the testpiece 102 is formed by body 106. The hollow interior 108 of the testpiece 102 is configured to be pressurized.

In one or more examples, the body 106 of the testpiece 102, forming the hollow interior 108, is formed by additive manufacturing.

In one or more examples, the test bed 110 is coupled to the testpiece 102. The test bed 110 is configured to internally pressurize the hollow interior 108 of the testpiece 102.

In one or more examples, the test bed 110 includes the base plate 120. The base plate 120 is configured to support the testpiece 102. The conduit 122 extends through the base plate 120. The conduit 122 is in fluid communication with the hollow interior 108 of the testpiece 102. In one or more examples, the testpiece 102 is coupled to the base plate 120.

In one or more examples, the testpiece 102 and the base plate 120 are monolithic and formed by additive manufacturing.

In one or more examples, the body 106 of the testpiece 102 includes the first portion 152 and the second portion 154. The first portion 152 extends along the axis 104. The second portion 154 extends from the first portion 152 along the axis 104.

In one or more examples, the first portion 152 includes the first material 156. The second portion 154 includes the second material 158. The first material 156 and the second material 158 are different.

In one or more examples, the first portion 152 includes the first cross-sectional dimension 160. The second portion 154 includes the second cross-sectional dimension 162. The first cross-sectional dimension 160 and the second cross-sectional dimension 162 are different.

In one or more examples, the first portion 152 includes the first thickness 164. The second portion 154 includes the second thickness 166. The first thickness 164 and the second thickness 166 are different.

In one or more examples, the first portion 152 includes at least one of the first material 156, the first cross-sectional dimension 160, and the first thickness 164. The second portion 154 includes at least one of the second material 158, the second cross-sectional dimension 162, and the second thickness 166. At least one of the first material 156 and the second material 158, the first cross-sectional dimension 160 and the second cross-sectional dimension 162, and the first thickness 164 and the second thickness 166 are different.

In one or more examples, the testpiece 102 is one of a plurality of the testpieces 168. Each one of the testpieces 168 includes the body 106 and the hollow interior 108. The hollow interior 108 of each one of the testpieces 168 is configured to be pressurized.

In one or more examples, the body 106 of each one of the testpieces 168 includes at least two portions 170. The at least two portions 170 include at least one of the materials 172 that are different, the cross-sectional dimensions 174 that are different, and the thicknesses 176 that are different.

In one or more examples, the test bed 110 is coupled to the testpieces 168. The test bed 110 is configured to internally pressurize the hollow interior 108 of each one of the testpieces 168. The test bed 110 includes the base plate 120 that is configured to support the testpieces 168. The test bed 110 includes the manifold 178 that extends through the base plate 120. The manifold 178 is in fluid communication with the hollow interior 108 of each one of the testpieces 168.

Figure 18:
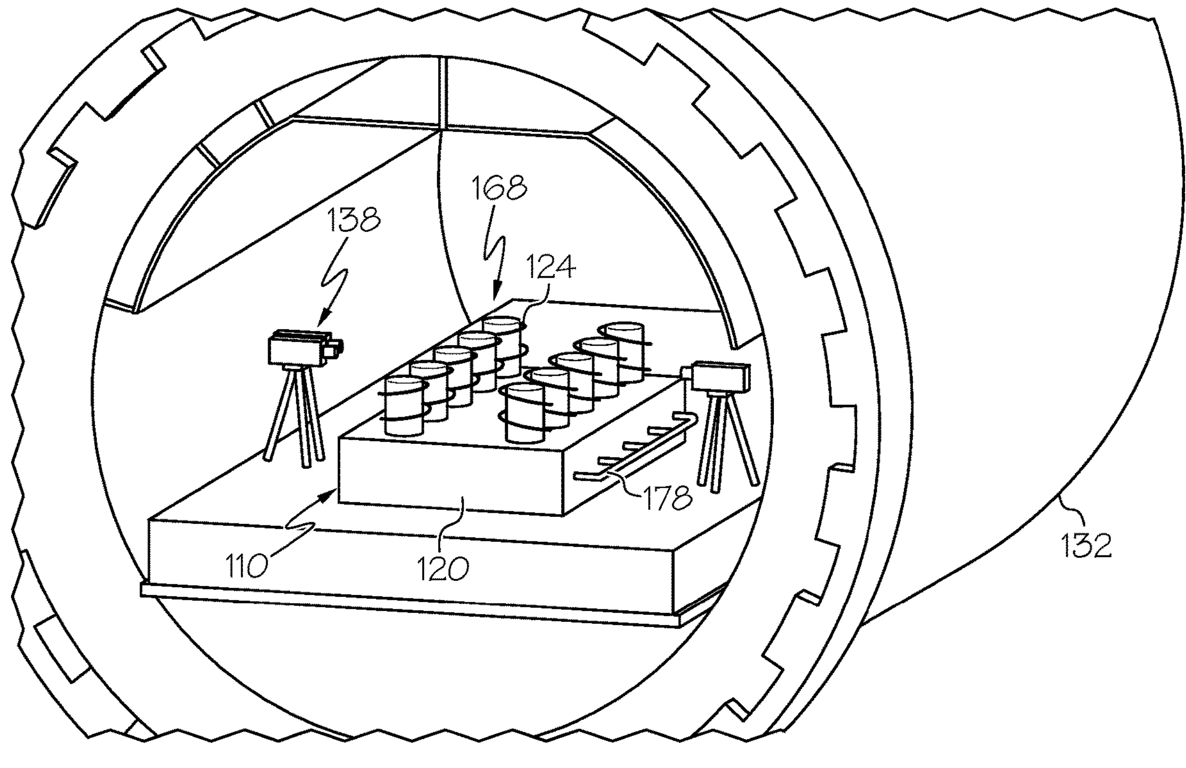
FIG. 18 is a schematic illustration of an example of a portion of the system.
Figure 19:
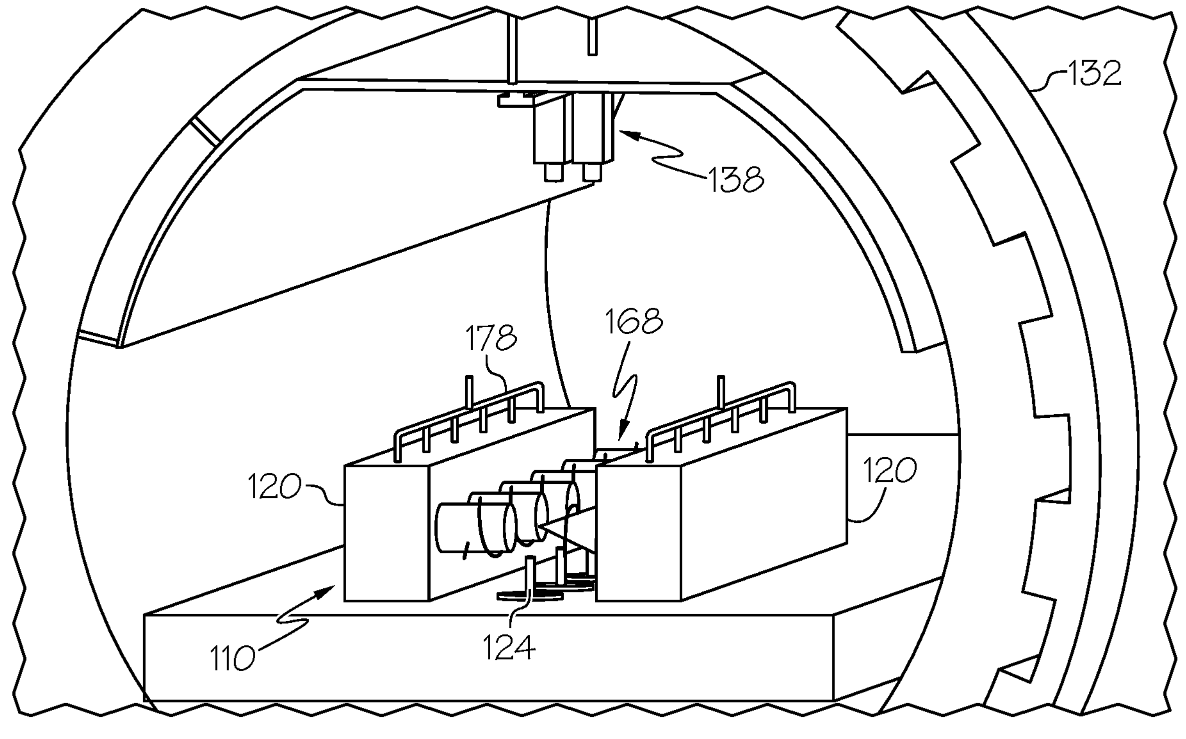
FIG. 19 is a schematic illustration of an example of a portion of the system.
Figure 20:
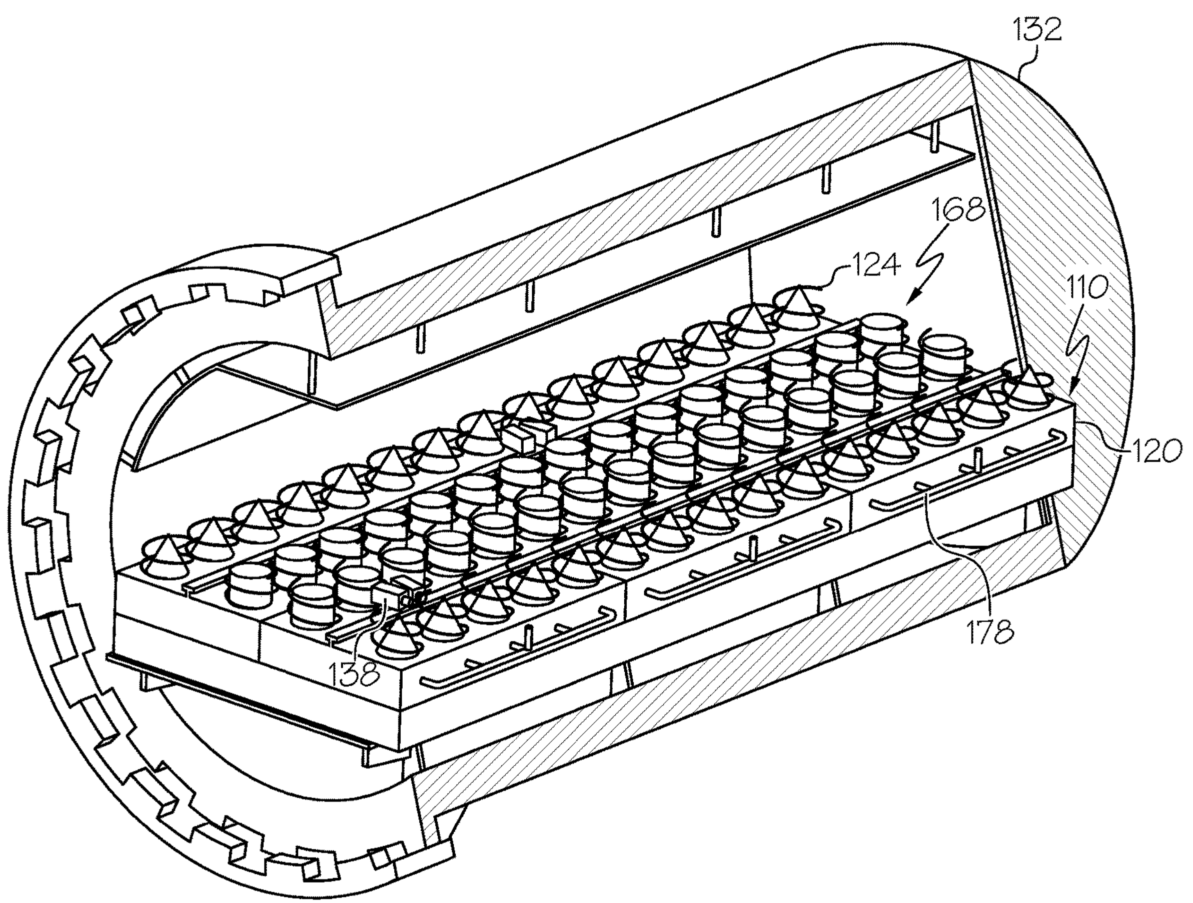
FIG. 20 is a schematic illustration of an example of a portion of the system.

Referring to FIGS. 3 and 17-21, the system 100 can have various different configurations and/or arrangements. In one or more examples, the at least one sensor 138 is movable relative to the plurality of testpieces 168. As an example, the base plate 120 of the test bed 110 includes a rail and a carriage. The sensor 138 is coupled to the carriage, which is mounted on and is movable along the rail (e.g., as shown in FIG. 20). In one or more examples, the testpieces 168 can be oriented and/or arranges to enable data acquisition, internal pressure control, and temperature control. In one or more examples, the testpieces 168 are coupled to the base plate 120 of the test bed 110 such that the axis 104 of one or more of the testpieces 168 is oriented at least approximately vertical (e.g., as shown in FIGS. 17, 18 and 20). In one or more examples, the testpieces 168 are coupled to the base plate 120 of the test bed 110 such that the axis 104 of one or more of the testpieces 168 is oriented at least approximately horizontally (e.g., as shown in FIG. 19).

Figure 22:
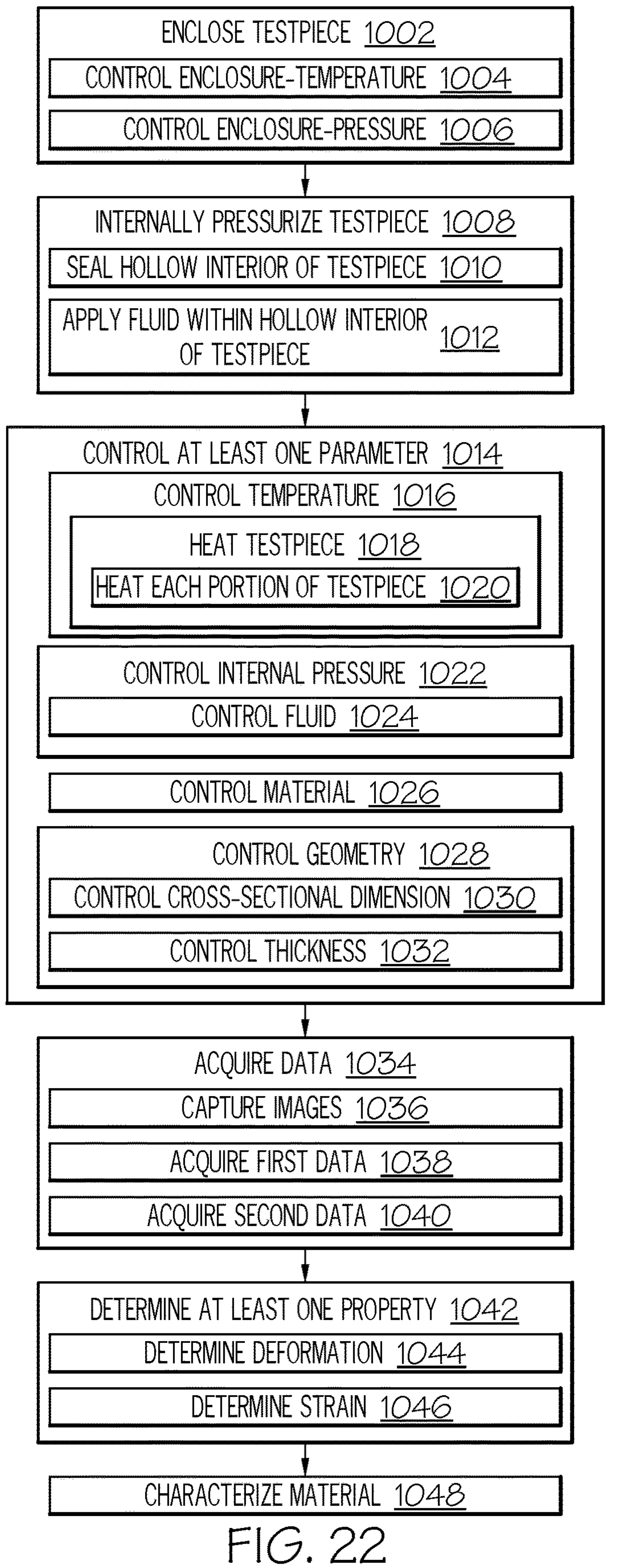
FIG. 22 is a flow diagram of an example of a method for material testing.

Referring generally to FIG. 22, by way of examples, the present disclosure is also directed to a method 1000 for material testing, which may also be referred to herein as a material testing method. The method 1000 facilitates improvements in material testing by enabling multiple materials to be tested in a single test, multiple test parameters to be tested in a single test, and multiple material properties to be measured in a single test.

Referring generally to FIGS. 1-21 and particularly to FIG. 22, the following are examples of the method 1000, according to the present disclosure. In one or more examples, the method 1000 is an example of the testing methodology illustrated in FIG. 2. In one or more examples, the method 1000 is implemented using the system 100 or the testpiece 102 (e.g., FIGS. 3-23). The method 1000 includes a number of elements, steps, and/or operations. Not all of the elements, steps, and/or operations described or illustrated in one example are required in that example. Some or all of the elements, steps, and/or operations described or illustrated in one example can be combined with other examples in various ways without the need to include other elements, steps, and/or operations described in those other examples, even though such combination or combinations are not explicitly described or illustrated by example herein.

In one or more examples, the method 1000 includes a step of (block 1002) enclosing the testpiece 102 within the enclosure 132. In one or more examples, the method 1000 includes a step of (block 1004) controlling (e.g., selecting and/or modifying) the enclosure-temperature 136 within the enclosure 132. In one or more examples, the method 1000 includes a step of (block 1006) controlling (e.g., selecting and/or modifying) the enclosure-pressure 134 within the enclosure 132. In one or more examples, the step of (block 1004) controlling the enclosure-temperature 136 and the step of (block 1006) controlling the enclosure-pressure 134 are examples of a step of (block 1014) controlling the at least one parameter of the test.

In one or more examples, the method 1000 includes a step of (block 1008) internally pressurizing the testpiece 102. In one or more examples, the method 1000, such as the step of (block 1008) internally pressurizing the testpiece 102 includes a step of (block 1010) sealing the hollow interior 108 of the testpiece 102 and a step of (block 1012) applying the fluid 196 within the hollow interior 108 of the testpiece 102. Application of the fluid 196 within the hollow interior 108 of the testpiece 102 facilitates an increase the internal pressure 182 of the testpiece 102. The increase in the internal pressure 182 of the testpiece 102 applies a load to or stress on the body 106 of the testpiece 102.

In one or more examples, the method 1000 includes the step of (block 1014) controlling (e.g., modifying or selecting) at least one parameter for the testing operation.

In one or more examples, the method 1000, such as the step of (block 1014) controlling the at least one parameter, includes a step of (block 1016) controlling (e.g., modifying or selecting) the temperature 180 of the testpiece 102 during the testing operation.

In one or more examples, the method 1000, such as the step of (block 1016) controlling the temperature 180 includes a step of (block 1018) heating the testpiece 102. In one or more examples, the step of (block 1018) heating the testpiece 102 includes a step of inductively heating the testpiece 102. In one or more examples, the step of (block 1018) heating the testpiece 102 includes a step of radiantly heating the testpiece 102. In one or more examples, the step of (block 1018) heating the testpiece 102 includes a step of conductively heating the testpiece 102. In one or more examples, the testpiece 102 includes at least two portions 170. In one or more examples, the step of (block 1018) heating the testpiece 102 includes a step of (block 1020) heating at least one or each one of the at least two portions 170 to different temperatures 180.

In one or more examples, the method 1000, such as the step of (block 1016) controlling the temperature 180 includes a step of cooling (e.g., actively cooling) the testpiece 102. In one or more examples, the testpiece 102 includes the at least two portions 170. In these examples, the step of cooling the testpiece 102 includes a step of cooling at least one of the at least two portions 170 to different temperatures 180.

In one or more examples, the temperatures 180 of the testpiece 102 is controlled (e.g., block 1016), at least in part, by controlling the enclosure-temperature 136 within the enclosure 132 and surrounding the testpiece 102 (e.g., block 1004).

In one or more examples, the method 1000, such as the step of (block 1014) selecting the at least one parameter, includes a step of (block 1022) controlling (e.g., modifying or selecting) the internal pressure 182 within the interior 108 of the testpiece 102 during the testing operation. In one or more examples, the method 1000, such as the step of (block 1022) controlling the internal pressure 182, includes a step of (block 1024) controlling the fluid 196 being applied within the interior 108 of the testpiece 102. As an example, the internal pressure 182 within the testpiece 102 is controlled by application of the fluid 196 and/or pressurization of the fluid 196 within the interior 108 of the testpiece 102 (e.g., block 1012).

In one or more examples, the step of (block 1014) controlling at least one parameter includes a step of (block 1026) controlling (e.g., selecting and/or modifying) the material 172 of the body 106 of the testpiece 102. In one or more examples, the testpiece 102 includes the first portion 152 that extends along the axis 104 and that includes the first material 156. The testpiece 102 includes the second portion 154 that extends from the first portion 152 along the axis 104 and that includes the second material 158. The first material 156 and the second material 158 are different. In other examples, the testpiece 102 includes any number of additional portions 170 that extend along the axis 104, for example from or between the first portion 152 and the second portion 154. In one or more examples, the material 172 of at least one of the portions 170 is different than the material 172 of at least another one of the portions 170. In one or more examples, the materials 172 of each one of the portions 170 is different. In one or more examples, the materials 172 of the body 106 are controlled during manufacture of the testpiece 102, such as during an additive manufacturing operation.

In one or more examples, the method 1000, such as the step of (block 1014) controlling the at least one parameter, includes a step of (block 1028) selecting (e.g., modifying and/or controlling) the geometry 194 of the testpiece 102.

In one or more examples, the geometry 194 of the testpiece 102 includes the cross-sectional dimension 174 of the body 106 of the testpiece 102. In these examples, the step of (block 1028) selecting the geometry 194 includes a step of (block 1030) controlling (e.g., modifying and/or selecting) the cross-sectional dimension 174 of the body 106. In one or more examples, the testpiece 102 includes the first portion 152 that extends along the axis 104 and that includes the first cross-sectional dimension 160. The testpiece 102 includes the second portion 154 that extends from the first portion 152 along the axis 104 and that includes the second cross-sectional dimension 162. The first cross-sectional dimension 160 and the second cross-sectional dimension 162 are different.

In one or more examples, the geometry 194 of the testpiece 102 includes the thicknesses 176 of the body 106 of the testpiece 102. In these examples, the step of (block 1028) controlling the geometry 194 includes a step of (block 1032) controlling (e.g., modifying and/or selecting) the thicknesses 176 of the body 106. In one or more examples, the testpiece 102 includes the first portion 152 that extends along the axis 104 and that includes the first thickness 164. The testpiece 102 includes the second portion 154 that extends from the first portion 152 along the axis 104 and that includes the second thickness 166. The first thickness 164 and the second thickness 166 are different.

In one or more examples, the shape, the cross-sectional dimension 174, and/or the thicknesses 176 of the body 106 are controlled during manufacture of the testpiece 102, such as during an additive manufacturing operation.

In other examples, additional parameters of the test can also be controlled (e.g., selected and/or modified) as desired or needed for a particular test. As an example, the type of the fluid 196 can be selected, such as gas or liquid, such as nitrogen, argon, oxygen, CO2, and the like. As another example, the temperature gradient along the body 106 of the testpiece 102 can be controlled.

The method 1000 includes a step of (block 1034) acquiring the data 114 representing the testpiece 102. In one or more examples, the data 114 is acquired before, during, and/or after the testpiece 102 is internally pressurized to apply the load or stress to the testpiece 102. In other words, the step of (block 1034) acquiring the data 114 is performed during and/or after the step of (block 1008) internally pressurizing the testpiece 102. In one or more examples, the step of (block 1034) acquiring the data 114 includes a step of (block 1036) capturing the images 184 of the testpiece 102. In one or more examples, the step of (block 1034) acquiring the data 114 includes a step of (block 1038) acquiring first data 188 (e.g., first imaged) representing the first portion 152 and a step of (block 1040) acquiring second data 190 (e.g., second images) representing the second portion 154.

In one or more examples, the method 1000 includes a step of (block 1042) determining at least one property 118 of the testpiece 102 using the data 114. In one or more examples, the step of (block 1042) determining at least one property 118 includes a step of determining the at least one property 118 of the first portion 152 and a step of determining the at least one property 118 of the second portion 154. In one or more examples, the at least one property 118 includes deformation 142 of the testpiece 102. As such, in one or more examples, the step of (block 1042) determining the at least one property 118 of the testpiece 102 includes a step of (block 1044) determining deformation 142. In one or more examples, the at least one property 118 includes strain 144 of the testpiece 102. As such, in one or more examples, the step of (block 1042) determining the at least one property 118 of the testpiece 102 includes a step of (block 1046) determining strain 144 of the testpiece 102, for example, using digital image correlation. In one or more examples, the step of (block 1042) determining the at least one property 118 of the testpiece 102 includes the step of (block 1044) determining deformation 142 and the step of (block 1046) determining strain 144 of the testpiece 102, for example, using digital image correlation. In one or more examples, the step of (block 1042) determining the at least one property 118 of the testpiece 102 includes the step of determining any other suitable type of material property.

In one or more examples, the testpiece 102 includes the first portion 152 that extends along the axis 104 and that includes at least one of the first material 156, the first cross-sectional dimension 160 and the first thickness 164. The testpiece 102 includes the second portion 154 that extends from the first portion 152 along the axis 104 and that includes at least one of the second material 158, the second cross-sectional dimension 162, and the second thickness 166. At least one of the first material 156 and the second material 158, the first cross-sectional dimension 160 and the second cross-sectional dimension 162, and the first thickness 164 and the second thickness 166 are different. In one or more examples, the testpiece 102 includes any number of additional portions 170, which include materials 172, geometries 194, thicknesses 176, and/or cross-sectional dimensions 174 that are different.

In one or more examples, the steps described above and illustrated in FIG. 22 can be applied to a plurality of the testpieces 168. In one or more examples, the method 1000 includes a step of internally pressurizing a plurality of the testpieces 168 (e.g., block 1008). In one or more examples, the method 1000 includes a step of acquiring the data 114 representing each one of the testpieces 168 before, during, and/or after internally pressurizing (e.g., block 1034). In one or more examples, the method 1000 includes a step of determining the at least one property 118 of each one of the testpieces 168 using the data 114 (e.g., block 1042).

In one or more examples, the body 106 of each one of the testpieces 168 includes at least two portions 170. The at least two portions 170 include at least one of materials 172 that are different, cross-sectional dimensions 174 that are different, and thicknesses 176 that are different. In these examples, the step of acquiring the data 114 includes a step of acquiring the data 114 representing the at least two portions 170 of each one of the testpieces 168 (e.g., block 1038 and block 1040).

In one or more examples, the method 1000 includes a step of (block 1048) characterizing the testpiece 102, such as the one or more materials 172 of the testpiece 102, based on the at least one property 118 corresponding to at least one of the materials 172, the cross-sectional dimensions 174, and the thicknesses 176. In these examples, the material characterization generated according to the method 1000 can be used for analytical modelling.

Figure 23:
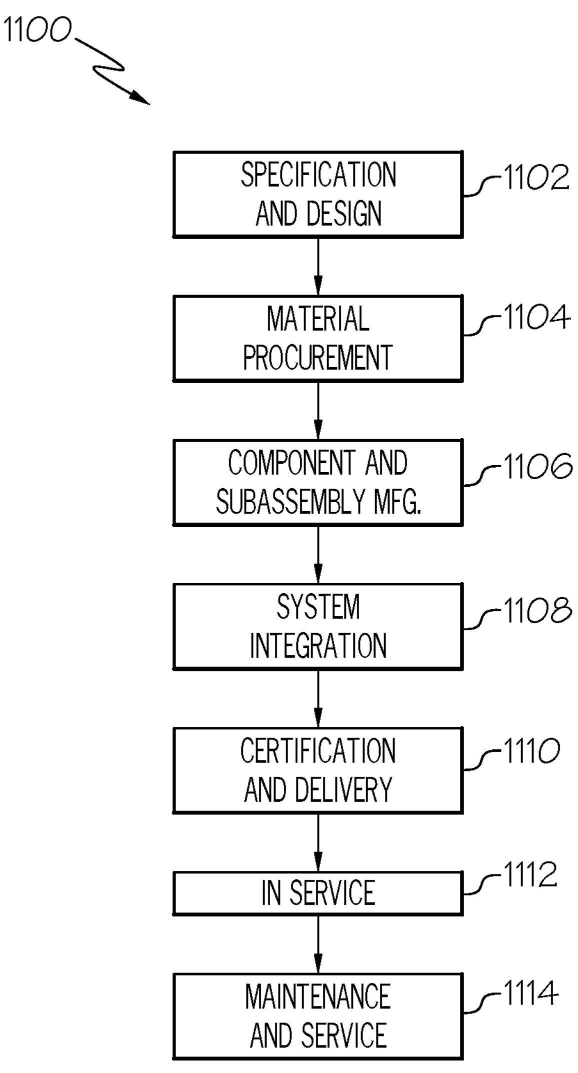
FIG. 23 is a flow diagram of an example of an aircraft manufacturing and service method.
Figure 24:
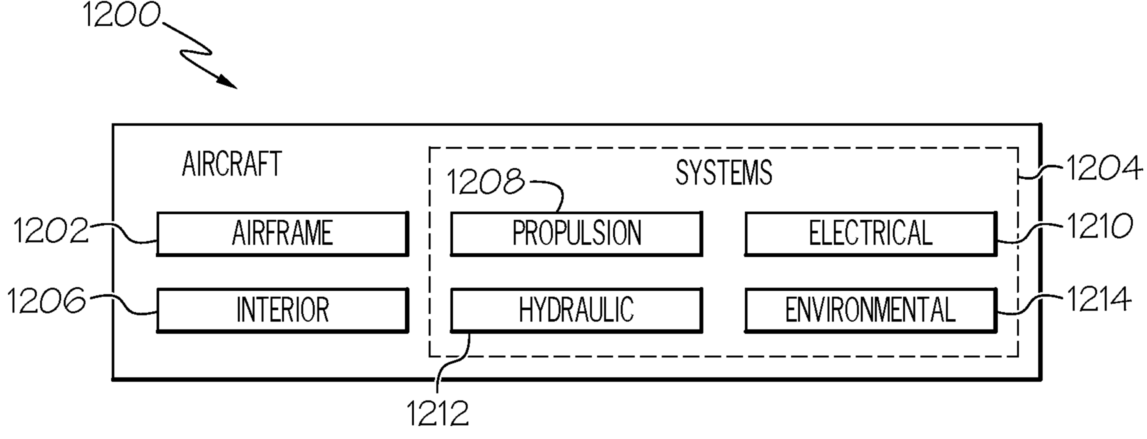
FIG. 24 is a schematic block diagram of an example of an aircraft.

Referring now to FIGS. 23 and 24, examples of the system 100, the testpiece 102, and the method 1000 described herein, may be related to, or used in the context of, the aerospace manufacturing and service method 1100, as shown in the flow diagram of FIG. 23 and an aircraft 1200, as schematically illustrated in FIG. 24. As an example, the aircraft 1200 and/or the manufacturing and service method 1100 may include or utilize components made of materials that are characterized using data acquired using the system 100, the testpiece 102, and/or according to the method 1000.

Referring to FIG. 24, which illustrates an example of the aircraft 1200. The aircraft 1200 can be any aerospace vehicle or platform. In one or more examples, the aircraft 1200 includes the airframe 1202 having the interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to the airframe 1202 of the aircraft 1200. In yet other examples, the onboard systems 1204 also include one or more other systems, such as, but not limited to, communications systems, avionics systems, software distribution systems, network communications systems, passenger information/entertainment systems, guidance systems, radar systems, weapons systems, and the like. The aircraft 1200 can have any number of components made of materials that are characterized using data acquired using the system 100, the testpiece 102, and/or according to the method 1000.

Referring to FIG. 23, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 23 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the system 100, the testpiece 102, and the method 1000, shown and described herein, may be employed during any one or more of the stages of the manufacturing and service method 1100 shown in the flow diagram illustrated by FIG. 25. In an example, components of the aircraft 1200 can be manufactured of materials characterized using data acquired using the system 100, the testpiece 102, and/or according to the method 1000 during a portion of component and subassembly manufacturing (block 1106) and/or system integration (block 1108). Further, components of the aircraft 1200 can be manufactured of materials characterized using data acquired using the system 100, the testpiece 102, and/or according to the method 1000 while the aircraft 1200 is in service (block 1112). Also, components of the aircraft 1200 can be manufactured of materials characterized using data acquired using the system 100, the testpiece 102, and/or according to the method 1000 during system integration (block 1108) and certification and delivery (block 1110). Similarly, components of the aircraft 1200 can be manufactured of materials characterized using data acquired using the system 100, the testpiece 102, and/or according to the method 1000 while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-21 and 24, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-21 and 24, referred to above, need be included in every example and not all elements, features, and/or components described herein are necessarily depicted in each illustrative example. Accordingly, some of the elements, features, and/or components described and illustrated in FIGS. 1-21 and 24 may be combined in various ways without the need to include other features described and illustrated in FIGS. 1-21 and 24, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-21 and 24, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-21 and 24, and such elements, features, and/or components may not be discussed in detail herein with reference to each of FIGS. 1-21 and 24. Similarly, all elements, features, and/or components may not be labeled in each of FIGS. 1-21 and 24, but reference numerals associated therewith may be utilized herein for consistency.

In FIGS. 22 and 23, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 22 and 23 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100, the method 1000, and the testpiece 102 have been shown and described, modifications may occur to those skilled in the art upon reading the specification. The present application includes such modifications and is limited only by the scope of the claims.

What is claimed is:

1. A system for material testing, the system comprising:
a testpiece that comprises:
a body that is continuous and extends along an axis and that comprises at least two portions; and
a hollow interior that is formed by the body,
wherein the at least two portions comprise at least one of materials that are different, cross-sectional dimensions that are different, or thicknesses that are different;
a test bed that internally pressurizes the hollow interior of the testpiece; and
a data collector that acquires data representing the testpiece.

2. The system of claim 1, wherein the body, comprising the hollow interior, is formed by additive manufacturing.

3. The system of claim 1, wherein the data collector comprises:
a sensor that collects the data; and
a computer that determines at least one property of the testpiece based on the data collected by the sensor.

4. The system of claim 3, wherein:
the sensor comprises an image sensor; and
the computer determines deformation and strain of the testpiece using digital image correlation.

5. The system of claim 1, wherein the test bed comprises:
a base plate that supports the testpiece; and
a conduit that extends through the base plate and that is in fluid communication with the hollow interior of the testpiece.

6. The system of claim 1, further comprising a heater that heats the testpiece.

7. The system of claim 1, further comprising an enclosure that encloses the testpiece
wherein at least one of an enclosure-pressure within the enclosure is controllable and an enclosure-temperature within the enclosure is controllable.

8. The system of claim 1, wherein:
the body of the testpiece comprises:
a first portion that extends along the axis; and
a second portion that extends from the first portion along the axis;
the first portion comprises a first material;
the second portion comprises a second material; and
the first material and the second material are different.

9. The system of claim 1, wherein:
the body of the testpiece comprises:
a first portion that extends along the axis; and
a second portion that extends from the first portion along the axis;
the first portion comprises a first cross-sectional dimension;
the second portion comprises a second cross-sectional dimension; and
the first cross-sectional dimension and the second cross-sectional dimension are different.

10. The system of claim 1, wherein:
the body of the testpiece comprises:
a first portion that extends along the axis; and
a second portion that extends from the first portion along the axis;
the first portion comprises a first thickness;
the second portion comprises a second thickness; and
the first thickness and the second thickness are different.

11. The system of claim 1, wherein:

the body of the testpiece comprises:

a first portion that extends along the axis; and a second portion that extends from the first portion along the axis;

the first portion comprises a first material, a first cross-sectional dimension, and a first thickness;

the second portion comprises at least one of a second material, a second cross-sectional dimension, and a second thickness; and at least two of the first material and the second material, the first cross-sectional dimension and the second cross-sectional dimension, or the first thickness and the second thickness is different.

12. The system of claim 1, further comprising a plurality of testpieces, wherein:

each one of the testpieces comprises the body and the hollow interior;

the test bed internally pressurizes the hollow interior of each one of the testpieces; and the data collector acquires the data that represents each one of the testpieces.

13. The system of claim 1, wherein:

the body of the testpiece comprises:

a first portion that extends along the axis; and a second portion that extends from the first portion along the axis;

the first portion comprises at least one of a first material, a first cross-sectional dimension, and a first thickness;

the second portion comprises at least one of a second material, a second cross-sectional dimension, and a second thickness; and the first material and the second material, the first cross-sectional dimension and the second cross-sectional dimension, and the first thickness and the second thickness are different.

14. A system for material testing, the system comprising:

a testpiece that comprises:

a body that is continuous and extends along an axis and that comprises at least two portions; and a hollow interior formed by the body, wherein:

the at least two portions comprise at least one of materials that are different, cross-sectional dimensions that are different, or thicknesses that are different; and the hollow interior of the testpiece is configured to be pressurized.

15. The system of claim 14, wherein:

the body of the testpiece comprises:

a first portion that extends along the axis; and a second portion that extends from the first portion along the axis;

the first portion comprises a first material, a first cross-sectional dimension, and a first thickness;

the second portion comprises a second material, a second cross-sectional dimension, and a second thickness; and at least two of the first material and the second material, the first cross-sectional dimension and the second cross-sectional dimension, or the first thickness and the second thickness is different.

16. The system of claim 14, further comprising a plurality of testpieces, wherein:

each one of the testpieces comprises the body and the hollow interior; and the hollow interior of each one of the testpieces is configured to be pressurized.

17. The system of claim 16, wherein:

the body of each one of the testpieces comprises:

a first portion that extends along the axis; and a second portion that extends from the first portion along the axis;

the first portion comprises a first material, a first cross-sectional dimension, and a first thickness;

the second portion comprises a second material, a second cross-sectional dimension, and a second thickness; and at least one of the first material and the second material, the first cross-sectional dimension and the second cross-sectional dimension, or the first thickness and the second thickness is different.

18. A method for material testing, the method comprising steps of:

internally pressurizing a testpiece, wherein the testpiece comprises a continuous body having at least two portions, and wherein the at least two portions comprise at least one of materials that are different, cross-sectional dimensions that are different, or thicknesses that are different;

acquiring data representing the testpiece while internally pressurizing; and determining at least one property of the testpiece using the data.

19. The method of claim 18, wherein:

the body that extends along an axis and forms a hollow interior; and the step of internally pressurizing the testpiece comprises applying a fluid within the hollow interior to increase an internal pressure of the testpiece.

20. The method of claim 19, wherein:

the testpiece comprises:

a first portion that extends along the axis and that comprises a first material, a first cross-sectional dimension, and a first thickness;

a second portion that extends from the first portion along the axis and that comprises a second material, a second cross-sectional dimension, and a second thickness;

at least one of the first material and the second material, the first cross-sectional dimension and the second cross-sectional dimension, or the first thickness and the second thickness is different;

the step of acquiring data comprises acquiring first data representing the first portion and acquiring second data representing the second portion; and the step of determining at least one property comprises determining the at least one property of the first portion and the at least one property of the second portion.

* * * * *